(12) United States Patent
Yamashita et al.

(10) Patent No.: US 9,367,459 B2
(45) Date of Patent: Jun. 14, 2016

(54) SCHEDULING METHOD AND MULTI-CORE PROCESSOR SYSTEM

(71) Applicant: FUJITSU LIMITED, Kawasaki-shi, Kanagawa (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 13/934,951

(22) Filed: Jul. 3, 2013

(65) Prior Publication Data

US 2013/0297888 A1 Nov. 7, 2013

Related U.S. Application Data

(63) Continuation of application No. PCT/JP2011/050187, filed on Jan. 7, 2011.

(51) Int. Cl.
| | |
|---|---|
| G06F 9/38 | (2006.01) |
| G06F 12/08 | (2016.01) |
| G06F 9/48 | (2006.01) |
| G06F 3/06 | (2006.01) |
| G06F 12/02 | (2006.01) |
| G06F 9/50 | (2006.01) |

(52) U.S. Cl.
CPC ............ *G06F 12/0815* (2013.01); *G06F 3/065* (2013.01); *G06F 9/4843* (2013.01); *G06F 9/5016* (2013.01); *G06F 12/0284* (2013.01); *G06F 9/3851* (2013.01); *Y02B 60/1225* (2013.01); *Y02B 60/142* (2013.01)

(58) Field of Classification Search
None
See application file for complete search history.

(56) References Cited

U.S. PATENT DOCUMENTS

| | | | | |
|---|---|---|---|---|
| 5,898,883 | A | * | 4/1999 | Fujii et al. .................. 712/28 |
| 5,930,511 | A | * | 7/1999 | Hinsley ....................... 717/164 |

(Continued)

FOREIGN PATENT DOCUMENTS

| | | |
|---|---|---|
| EP | 0 416 768 A2 | 3/1991 |
| JP | 5-127904 A | 5/1993 |

(Continued)

OTHER PUBLICATIONS

Daehoon Kim, et al., "Virtual Snooping: Filtering Snoops in Virtualized Multi-Cores", 2010 43rd Annual IEEE/ACM International Symposium on Microarchitecture, pp. 459-470.

(Continued)

*Primary Examiner* — Adam M Queler
*Assistant Examiner* — Dustin Bone
(74) *Attorney, Agent, or Firm* — Arent Fox LLP

(57) ABSTRACT

A scheduling method of a scheduler that manages threads is executed by a computer. The scheduling method includes selecting a CPU of relatively less load, when a second thread is generated from a first thread to be processed; determining whether the second thread operates exclusively from the first thread; copying a first storage area assessed by the first thread onto a second storage area managed by the CPU, when the second thread operates exclusively; calculating based on an address of the second storage area and a predetermined value, an offset for a second address for the second thread to access the first storage area; and notifying the CPU of the offset for the second address to convert a first address to a third address for accessing the second storage area.

13 Claims, 15 Drawing Sheets

(56) References Cited

U.S. PATENT DOCUMENTS

| | | | |
|---|---|---|---|
| 2001/0011327 A1* | 8/2001 | Tremblay | 711/125 |
| 2003/0014471 A1 | 1/2003 | Ohsawa et al. | |
| 2005/0021913 A1 | 1/2005 | Heller, Jr. | |
| 2005/0120194 A1 | 6/2005 | Kissell | |
| 2006/0031810 A1 | 2/2006 | Peng et al. | |
| 2007/0150900 A1 | 6/2007 | Hankins et al. | |
| 2007/0180197 A1 | 8/2007 | Wright et al. | |
| 2007/0294694 A1 | 12/2007 | Jeter et al. | |
| 2009/0165016 A1* | 6/2009 | Bell et al. | 718/107 |
| 2010/0332763 A1 | 12/2010 | Kornegay et al. | |
| 2011/0252075 A1* | 10/2011 | Ylonen et al. | 707/818 |

FOREIGN PATENT DOCUMENTS

| | | |
|---|---|---|
| JP | 9-146904 A | 6/1997 |
| JP | 10-143382 A | 5/1998 |
| JP | 10-198644 A | 7/1998 |
| JP | 2000-242510 A | 9/2000 |
| JP | 2003-029984 A | 1/2003 |
| JP | 2007-504535 A | 3/2007 |
| WO | WO 2005/022384 A1 | 3/2005 |

OTHER PUBLICATIONS

Extended European Search Report, European Patent Application No. 11855010.2 dated Apr. 24, 2014.

Daehoon Kim, et al., "Virtual Snooping: Filtering Snoops in Virtualized Multi-Cores", 2010 43rd Annual IEEE/AACM International Symposium on Microarchitecture, pp. 459-470.

Supplementary European Search Report, European Patent Application No. 11855010.2 dated Apr. 24, 2014.

International Search Report & Written Opinion issued in PCT/JP2011/050187, mailed Mar. 8, 2011, 9 pages.

* cited by examiner

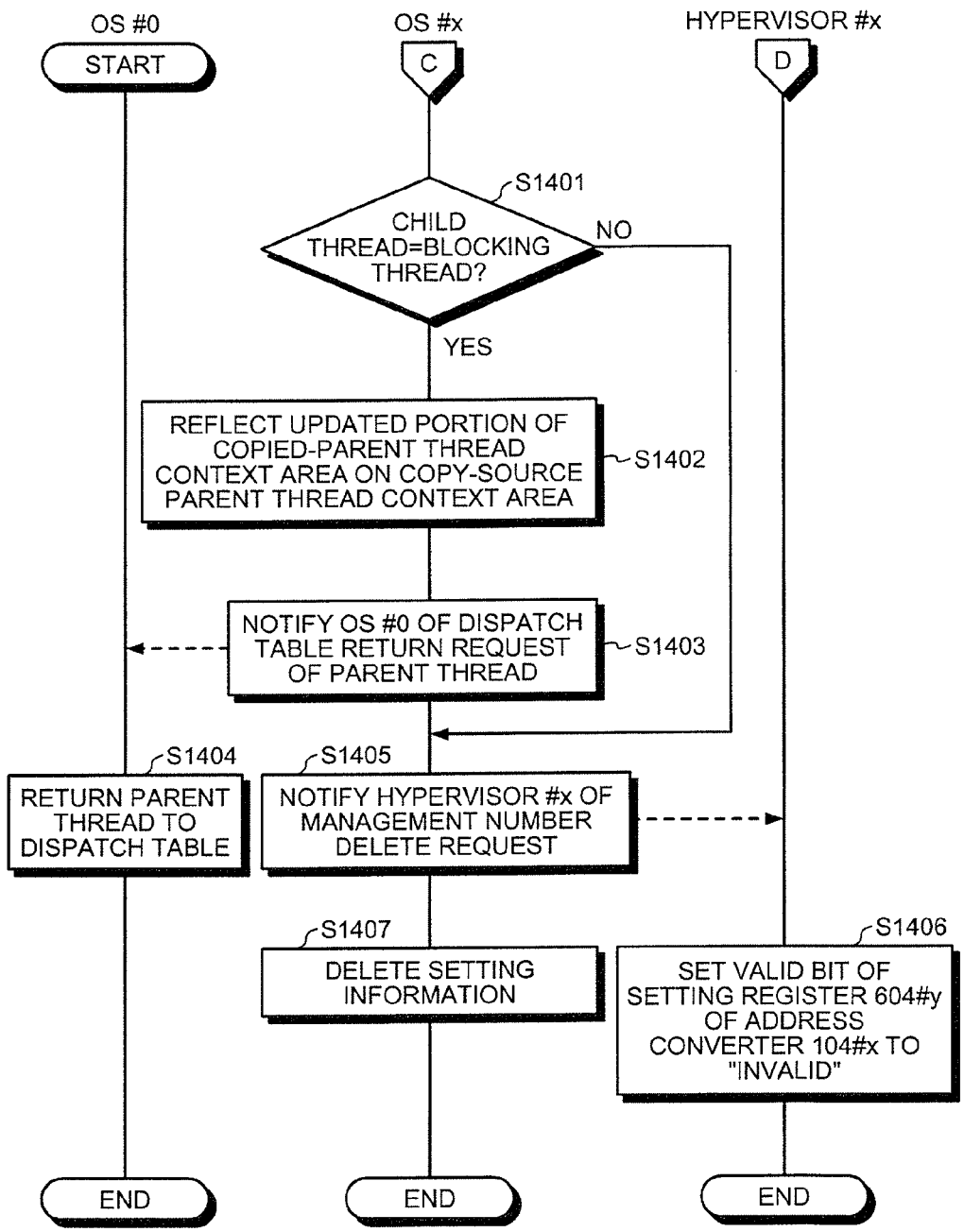

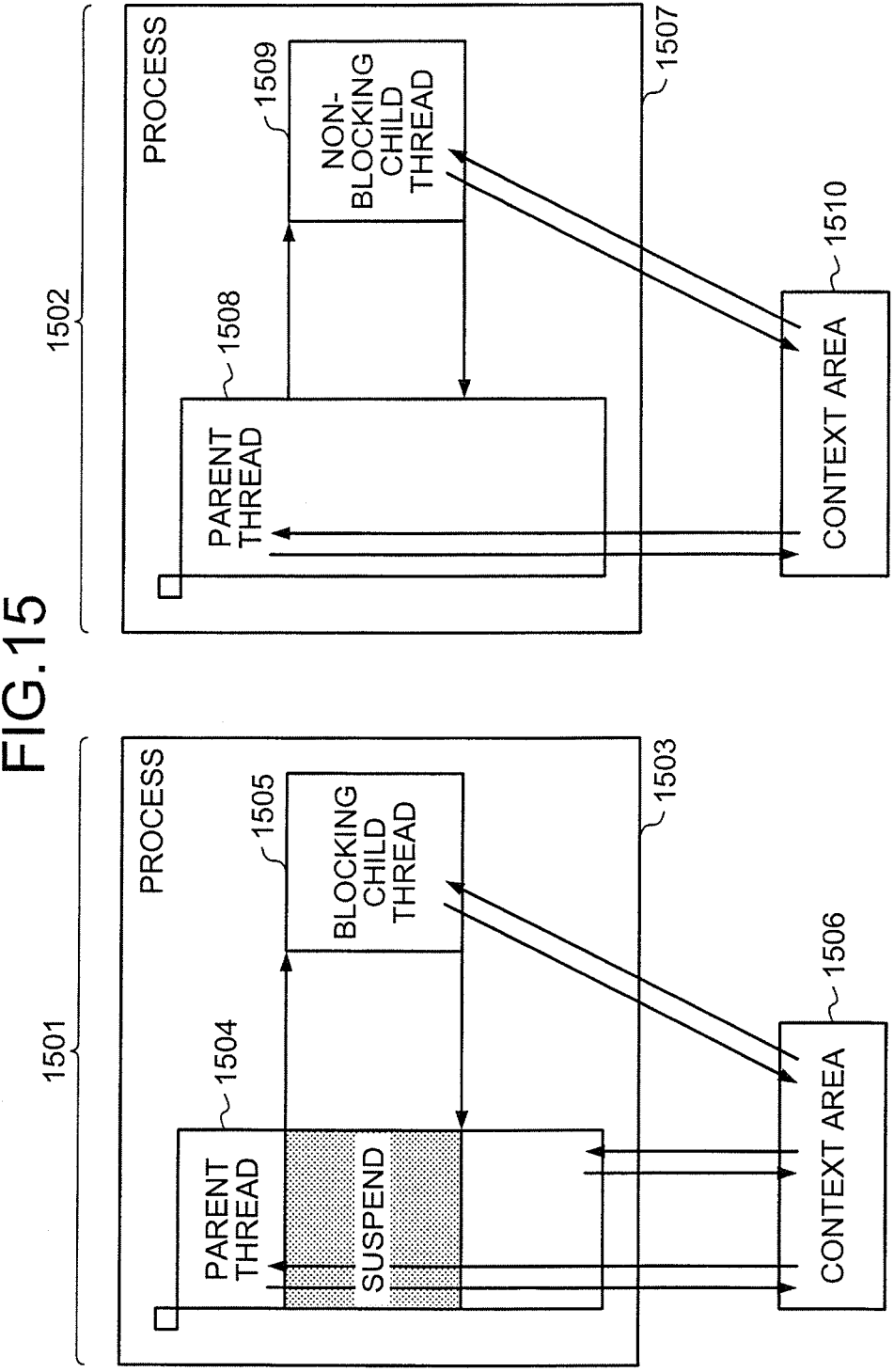

SCHEDULING METHOD AND MULTI-CORE PROCESSOR SYSTEM

CROSS REFERENCE TO RELATED APPLICATIONS

This application is a continuation application of International Application PCT/JP2011/050187, filed on Jan. 7, 2011 and designating the U.S., the entire contents of which are incorporated herein by reference.

FIELD

The embodiments discussed herein relate to a scheduling method and a multi-core processor system.

BACKGROUND

Recently, in a single system, the number of devices that employ a configuration in which a multi-core processor system having multiple cores is increasing. In the case of creating a program that runs on the multi-core processor system, an operation occurs that extracts parallelism in the program based on a conventional program for a single-core processor system having a single core in a single system. In particular, due to recent software complexity and increased scale, a program for the multi-core processor system is created by utilizing existing software resources instead of newly creating a program, thereby achieving a reduction in the number of steps required for program creation and for the verification. As a parallelism extraction method, a technique that extracts the parallelism through manual retrieval or a compiler (referred to as Prior Art 1).

By assigning the extracted parallel processing to cores through an application of Prior Art 1, the multi-core processor system can execute processing at a higher speed than a case of execution of the processing by a single core. Each of the cores executes a program in units of threads. Memory and devices utilized by threads are managed according to process, each of which has one or more threads. The process-to-thread properties are such that threads belonging to the same process share a memory space and threads belonging to different processes do not share any memory space.

Disclosed as a technique that capitalizes on the throughputs of the multiple cores is a technique that, when multiple application softwares (hereinafter, "apps") are activated, executes the apps by separate cores to thereby capitalize on the parallelism effects of the cores (referred to as Prior Art 2). Further, disclosed as a technique for distributing load among multiple cores is a technique that periodically acquires the load quantity of cores to relocate threads assigned to the cores (referred to as Prior Art 3).

Disclosed as a determination technique of determining whether to perform parallel processing is a technique that determines whether another core can execute a parent thread's fork command and if so, causes a child thread to be executed by the another core. Disclosed as a technique used when executing a child thread by another core is a technique that copies the context area of a thread to a storage area managed by another core (see, e.g., Japanese Laid-Open Patent Publication Nos. 2003-29984 and H5-127904). The context area is an area that stores data used by threads such as CPU register values, program counters, and stack pointers.

Further, disclosed as a technique for preventing address collisions that occur when threads are migrated to other cores is a technique having a memory address space shared by multiple threads and a memory address space not shared by threads (see, e.g., Japanese Laid-Open Patent Publication No. H9-146904). In the technique of Patent Document 3, address conversion is performed in the case of memory access to the latter address space so that the address space can be arbitrarily switched, thereby enabling address collision to be prevented.

Child threads generated from a parent thread include a blocking thread in which a child thread operates in a state exclusive of operation of the parent thread, and a non-blocking thread in which a child thread and the parent thread operate independently of one another. In FIG. 15, operations of the blocking thread and the non-blocking thread are depicted.

FIG. 15 is an explanatory view of the operations of the blocking thread and the non-blocking thread. Reference numeral 1501 designates the operation of a blocking thread and reference numeral 1502 designates the operation of a non-blocking thread.

A process 1503 denoted by reference numeral 1501 includes a parent thread 1504 and a blocking child thread 1505. The parent thread 1504 and the blocking child thread 1505 access the same context area, area 1506. During the execution of the blocking child thread 1505, the execution of the parent thread 1504 is suspended and the blocking child thread 1505 updates data stored in the context area 1506. After the completion of the execution of the blocking child thread 1505, the parent thread 1504 inherits the updated context area 1506 and executes processing.

In this manner, the blocking child thread 1505 performs operations independent from those of the parent thread 1504, but a risk of concurrent access of the context area 1506 occurs if execution is performed concurrent with the parent thread 1504. Accordingly, the blocking child thread 1505 is executed in a state that completely excludes the execution of the parent thread 1504.

A process 1507 denoted by reference numeral 1502 includes a parent thread 1508 and a non-blocking child thread 1509. The parent thread 1508 and the non-blocking child thread 1509 access the same context area, area 1510. During the execution of the non-blocking child thread 1509 as well, the parent thread 1508 is executed and accesses the context area 1510 at a timing different from that of the non-blocking child thread 1509.

In this manner, the non-blocking child thread 1509 accesses the memory at a timing different from that of the parent thread 1508 and hence, concurrent execution is permitted. If concurrent access of the context area 1510 is possible and the parent thread 1508 and the non-blocking child thread 1509 are synchronized, code is inserted into the two threads to perform exclusive processing or synchronous processing using communication between the threads.

In the technique of Prior Art 1 of the prior arts, code for exclusive processing or synchronous processing is inserted into source code when parallel operation is to be performed. If performed manually, however, failure to insert code for exclusive processing or synchronous processing may occur, resulting in program defects. The parallelism extraction by a compiler may arise in a problem of difficulty in determining various operation states of software and selecting proper exclusive processing or synchronous processing.

In either method of manual insertion or compiler parallelism extraction, the generated execution object is altered from an execution object for a single-core processor system. Hence, due to little or no reduction in the number of verification steps, a problem arises in that an enormous number of verification steps may occur for an execution object for the multi-core processor system.

The technique of Prior Art 2 addresses a problem in that, with respect to a single app, the app is executed at the same speed as that of the single-core processor system and does not benefit from the multi-core processor system. In this case, another problem lies in that load concentrates at a single core irrespective of the presence of multiple cores. The technique of Prior Art 3 requires that threads can be migrated to other cores. If a child thread is a blocking thread, however, a problem arises in that the child thread may block the parent thread, making migration difficult.

SUMMARY

According to an aspect of an embodiment, a scheduling method of a scheduler that manages threads is executed by a computer. The scheduling method includes selecting a CPU of relatively less load, when a second thread is generated from a first thread to be processed; determining whether the second thread operates exclusively from the first thread; copying a first storage area assessed by the first thread onto a second storage area managed by the CPU, when the second thread operates exclusively; calculating based on an address of the second storage area and a predetermined value, an offset for a second address for the second thread to access the first storage area; and notifying the CPU of the offset for the second address to convert a first address to a third address for accessing the second storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a flowchart (2) of the processing at the time of the execution of the child thread and the processing at the time of the completion thereof; and FIG. 15 is an explanatory view of operations of a blocking thread and a non-blocking thread.

DESCRIPTION OF EMBODIMENTS

Embodiments of a scheduling method and a multi-core processor system will be described in detail with reference to the accompanying drawings.

Figure 1:
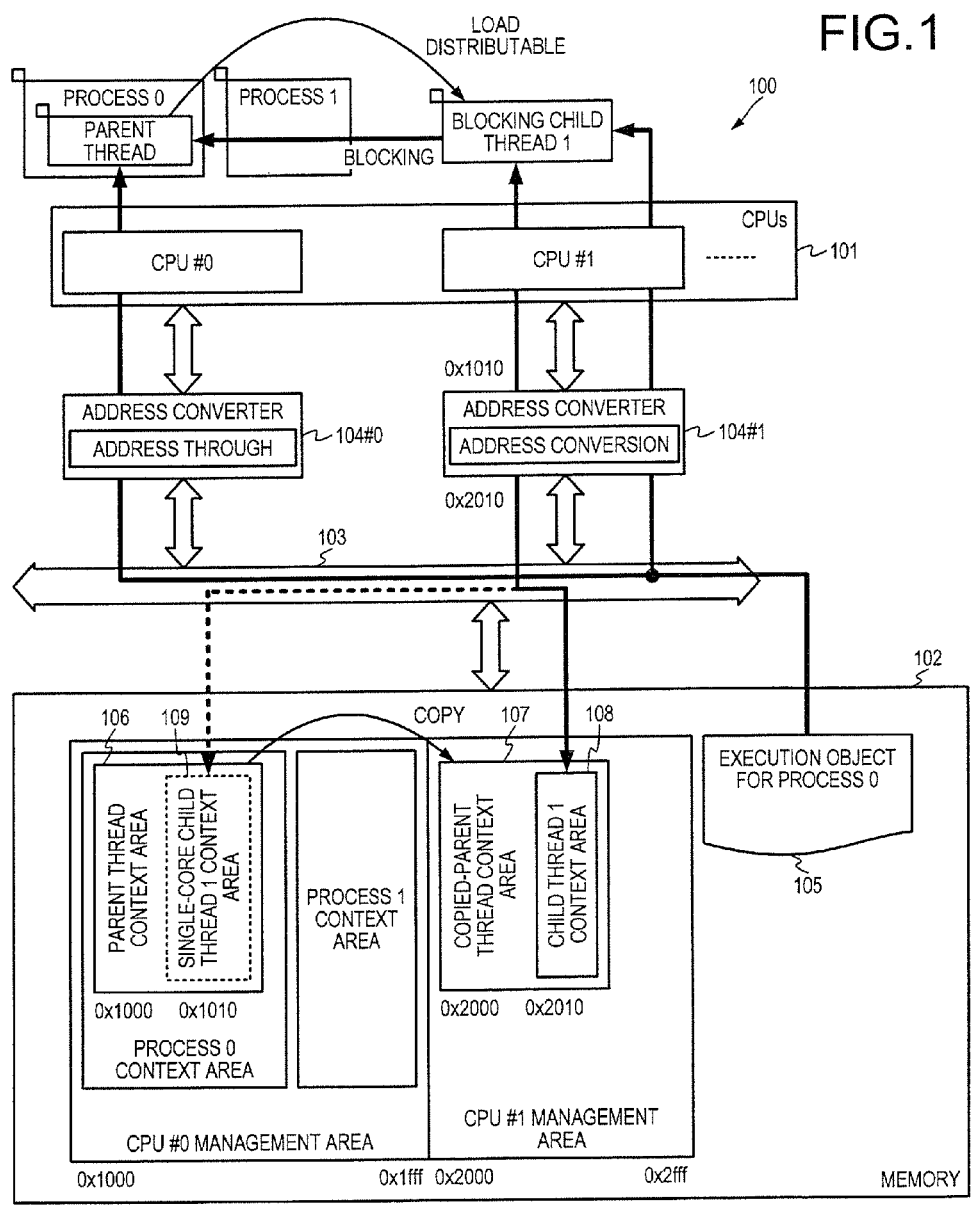
FIG. 1 is an explanatory view of operations of a multi-core processor system 100.

FIG. 1 is an explanatory view of operations of a multi-core processor system 100. The multi-core processor system 100 of FIG. 1 includes central processing units (CPUs) 101 that form multiple cores and memory 102. A portable terminal such as a cellular phone is assumed as the multi-core processor system 100. The CPUs 101 include a CPU #0 and a CPU #1. The CPUs 101 are connected to the memory 102 by a bus 103. The CPU #0 and the CPU #1 can communicate with an address converter 104#0 and an address converter 104#1, respectively. The address converters 104 have a function of converting CPU access addresses.

The CPU #0 uses 0x1000 to 0x1fff in the memory 102 as a CPU #0 management area and the CPU #1 uses 0x2000 to 0x2fff in the memory 102 as a CPU #1 management area. Each CPU among the CPUs 101 can access areas other than the management area thereof.

The CPU #0 executes a process 0 and a process 1. The CPU #0 establishes in the CPU #0 management area, a process 0 context area that stores data of the process 0 and a process 1 context area that stores data of the process 1. The process 0 is generated consequent to a read-in of an execution object 105 stored in the memory 102. The execution object 105 is an execution object generated for the single core.

When a parent thread in the process 0 requests the generation of a blocking child thread 1, the multi-core processor system 100 copies a parent thread context area 106 of the process 0 onto the CPU #1 management area. After the copying, the CPU #1 to which the blocking child thread 1 is assigned generates a child thread 1 context area 108 in a copied-parent thread context area 107.

Subsequently, the multi-core processor system 100 sets the address converter 104#1 to perform address conversion at a timing of the execution of the blocking child thread 1 of the process 0. For example, with respect to access by the blocking child thread 1, the address converter 104#1 makes a conversion from the address of a single-core child thread 1 context area 109 by the CPU #1, to the address of the child thread 1 context area 108. With respect to a response to the access of the child thread 1 context area 108, the address converter #1 makes a conversion from the address of the child thread 1 context area 108, to the address of the single-core child thread 1 context area 109.

In this manner, when executing the blocking thread, the multi-core processor system 100 copies the context area of the parent thread and makes an address conversion so that a CPU executing the blocking child thread accesses a copy-destination context area. As a result of this, in the multi-core processor system 100, each CPU accesses a different address so that the blocking thread can be executed by a CPU different from the CPU of the parent thread, thereby enabling a load distribution of the process for the single core.

Figure 2:
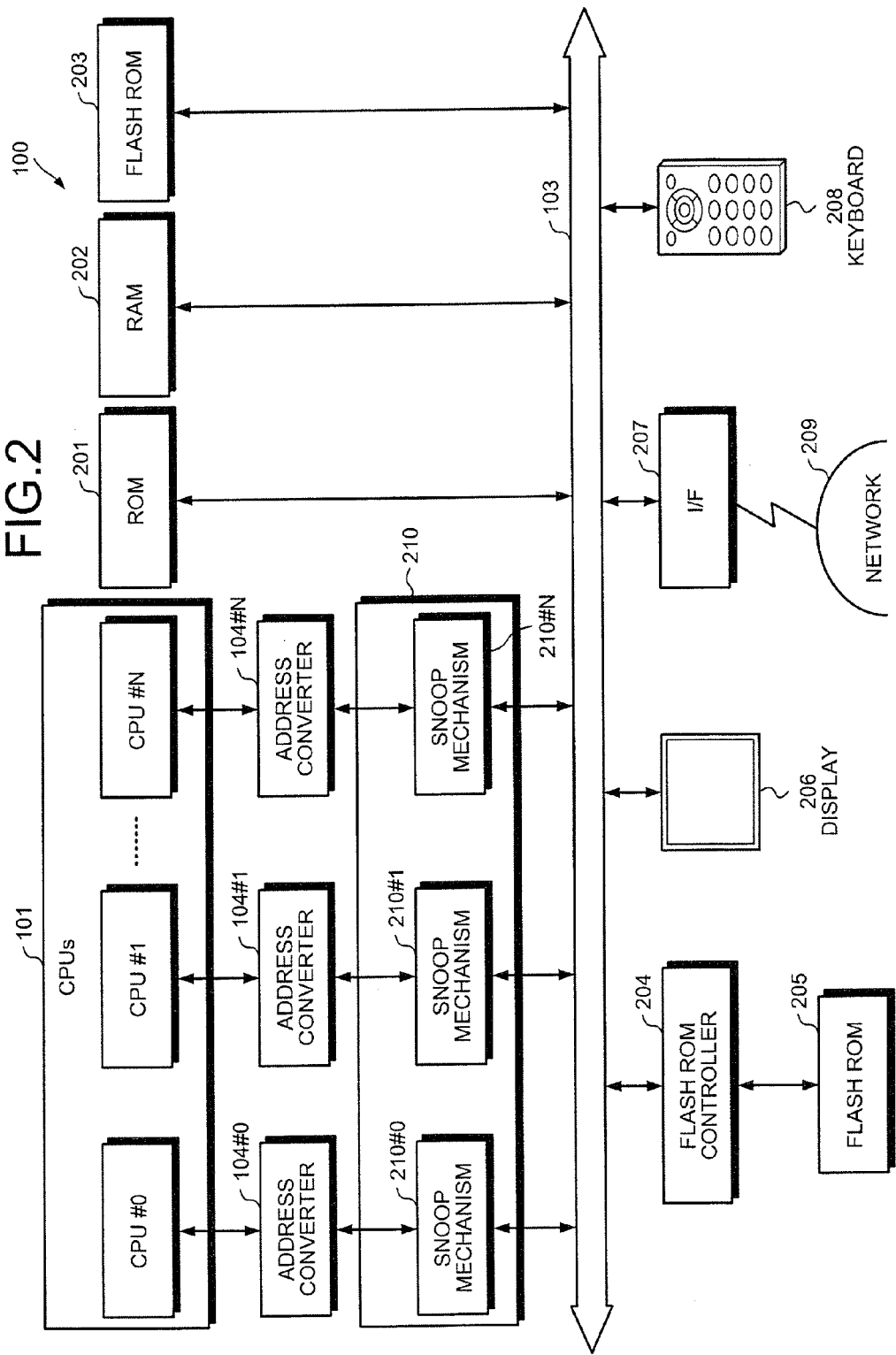
FIG. 2 is a block diagram of hardware of a multi-core processor system according to an embodiment.

FIG. 2 is a block diagram of hardware of a multi-core processor system according to an embodiment. In FIG. 2, the multi-core processor system 100 includes CPUs 101 equipped with multiple CPUs, a read-only memory (ROM) 201, and a random access memory (RAM) 202. The multi-core processor system 100 further includes a flash ROM 203, a flash ROM controller 204, and a flash ROM 205. The multi-core processor system 100 includes, as input/output devices for input and output with respect to the user or other devices, a display 206, an interface (I/F) 207, and a keyboard 208. The components are connected to each other by way of the bus 103.

The CPUs 101 provides overall control of the multi-core processor system 100. CPUs 101 refers to all CPUs that are single-core processors connected in parallel. The CPUs 101 includes a CPU #0 to a CPU #N. N is an integer not less than 1. The multi-core processor system is a computer system that includes processors equipped with multiple cores. As long as multiple cores are provided, a single core equipped with multiple cores or a processor group of single-core processors arranged in parallel may be provided. In this embodiment, description will be given taking CPUs that are single-core processors are arranged in parallel as an example.

The CPU #0 to CPU #N can communicate with the address converter 104, respectively. The CPU #0 to CPU #N each has dedicated cache memory. To establish dedicated cache memories coherency, the CPU #0 to CPU #N have a snoop mechanism 210#0 to a snoop mechanism 210#N.

The snoop mechanisms 210 are devices for establishing coherency among the cache memories accessed by the CPU #0 to CPU #N. The snoop mechanism 210#0 to the snoop mechanism 210#N communicate with one another. For example, when the cache memory of the CPU #0 is updated, the snoop mechanism 210#0 notifies the snoop mechanism 210#1 to the snoop mechanism 210#N accordingly. The protocol of the snoop mechanisms 210 includes an invalidity-type protocol and an update-type protocol. In either protocol, the snoop mechanism 210#1 to the snoop mechanism 210#N each interchange the contents of the cache memory thereof and of other cache memories with update state information.

A device that establishes coherency among the cache memories is classified as a cache coherency mechanism, an example of which is a snoop mechanism. The cache coherency mechanism is classified roughly into a snoop mechanism employing a snoop system and a directory system. The snoop mechanisms 210 according to this embodiment may be a cache coherency mechanism employing the directory system. The snoop mechanisms 210 are disposed between the address converters 104 and the bus 103.

The ROM 201 stores a program such as a boot program. The RAM 202 is used as a work area of the CPUs 101. The flash ROM 203 stores system software such as an operating system (OS), application software, etc. For example, in case of updating the OS, the multi-core processor system 100 receives a new OS by the I/F 207 and updates the old OS stored in the flash ROM 203 to the received new OS.

The flash ROM controller 204 controls the reading and writing of data with respect to the flash ROM 205 under the control of the CPUs 101. The flash ROM 205 stores data written under the control of the flash ROM controller 204. An example of data stored therein may be image data or video data acquired via the I/F 207 by the user of the multi-core processor system 100, or a program executing the scheduling method of this embodiment. The flash ROM 205 can be for example a memory card, an SD card, etc.

The display 206 displays data such as documents, images, and function information as well as a cursor, an icon, or a toolbox. For example, the display 206 can be a TFT liquid-crystal display.

I/F 207 is connected through a communication line to a network 209 such as a local area network (LAN), a wide area network (WAN), or an internet and is connected via the network 209 to other devices. I/F 207 provides an interface between the network 209 and interior and controls input/output of data from/to external devices. The I/F 207 can be for example a modem or a LAN adaptor.

The keyboard 208 has keys for the input of numerals and various instructions and performs data input. The keyboard 208 may be a touch-panel type input pad or ten key.

Figure 3:
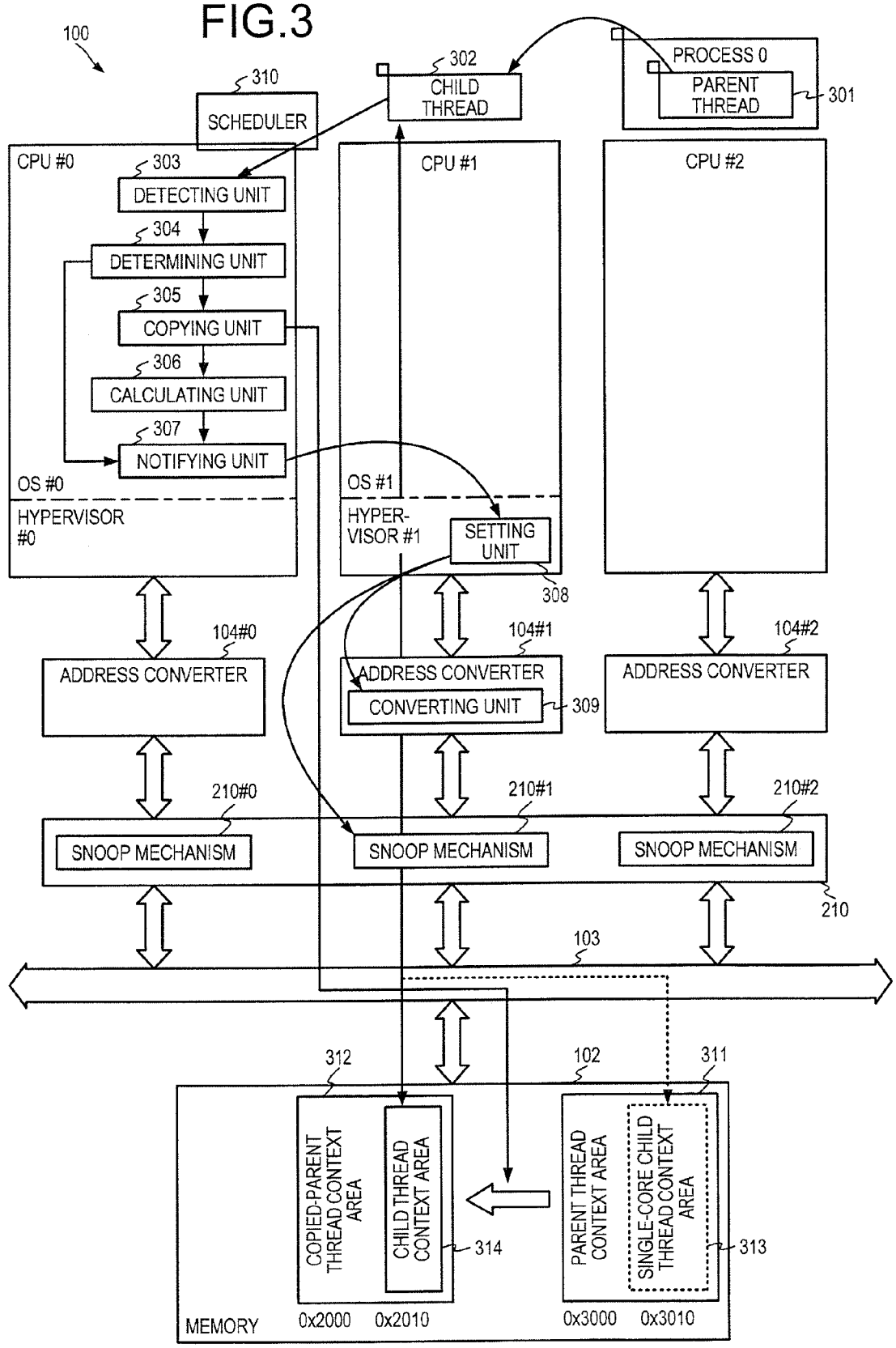
FIG. 3 is a block diagram of a functional configuration of the multi-core processor system 100.

Functions of the multi-core processor system 100 will be described. FIG. 3 is a block diagram of a functional configuration of the multi-core processor system 100. The multi-core processor system 100 includes a detecting unit 303, a determining unit 304, a copying unit 305, a calculating unit 306, a notifying unit 307, a setting unit 308, and a converting unit 309.

Among these functions forming a control unit, the functions of the detecting unit 303 to the notifying unit 307 are implemented by executing on the CPU #0, a program stored in a storage device. A storage device is for example the ROM 201, the RAM 202, the flash ROM 23, the flash ROM 205, etc. depicted in FIG. 2. The functions may be implemented by another CPU via the I/F 207.

The CPU #0 executes a hypervisor #0 and an OS#0. The hypervisor #0 is a program running directly on the hardware such as the CPU #0. The hypervisor #0 is a program that can execute a privileged instruction to directly refer to a register in the CPU #0, read out information of the register in the CPU #0, or rewrite the information of the register in the CPU #0. The OS #0 is software that operates on the hypervisor #0. For example, the OS #0 provides a library group utilized by threads or processes. The OS #0 has a dispatcher that assigns the threads and the processes to the CPU #0 and a scheduler 310 that determines the assigned threads.

As depicted in FIG. 3, the CPU #1 also executes a hypervisor #1 and an OS #1. Although not depicted, the CPU #2 to CPU #N execute hypervisors and OSs. The detecting unit 303 to the notifying unit 307 are included among the functions of the OS #0, the setting unit 308 is included among the functions of the hypervisor #1, and the converting unit 309 is included among the functions of the address converter 104#1.

The detecting unit 303 to the notifying unit 307 may be included among the functions of the scheduler 310. When the detecting unit 303 to the notifying unit 307 are not included among the functions of the scheduler 310, notification is given that the scheduler 310 performs the thread assignments. In FIG. 3, the CPU #2 is assumed to execute a parent thread 301 of the process 0 and the CPU #1 is assumed to execute a child thread 302. The CPU #2 accesses a parent thread context area 311 consequent to processing performed by the parent thread 301.

Although in FIG. 3 the detecting unit 303 to the notifying unit 307 are depicted as functions of CPU #0, the units may be functions of the CPU #1 to CPU #N. The setting unit 308 and the converting unit 309 are functions corresponding to a CPU to which child threads are assigned. To support a case where child threads are assigned the CPU #0, the hypervisor #0 and the address converter 104#0 may have equivalent functions to those of the setting unit 308 and the converting unit 309. Similarly, a hypervisor #2 to a hypervisor #N and an address converter 104#2 to an address converter 104#N corresponding to the CPU #2 to the CPU #N may also have functions equivalent to those of the setting unit 308 and the converting unit 309.

The detecting unit 303 has a function of detecting an assignment of a second thread to a second core. The second thread is generated from a first thread assigned to a first core among multiple cores. For example, the detecting unit 303 detects an assignment of the child thread 302 to the CPU #1. The child thread 302 is generated from a parent thread (first thread) assigned to the CPU #2 among the CPUs 101. Information indicating such detection is stored to a storage area of the CPU #0 such as the register, the cache memory, or the RAM 202.

The determining unit 304 has a function of determining whether the first and the second threads operate exclusively. For example, the determining unit 304 determines that, if the child thread 302 is a blocking thread, the first and the second threads operate exclusively and that, if the child thread is a non-blocking thread, the first and the second threads do not operate exclusively. The determination result is stored to a storage area of the CPU #0 such as the register, the cache memory, or the RAM 202.

As a determination method, the OS can make determination based on whether parent thread execution halt code is described in the execution object. For example, the OS is assumed to be an OS conforming to a portable operating system interface (POSIX). If a blocking thread is generated, the parent thread code of the execution object has a description of an instruction to a pthread_create( ) function that generates threads that precede description of an instruction to a pthread_join( ) function that waits for the completion of threads. When such description is made, the determining unit 304 determines that the second thread is a blocking thread.

The copying unit 305 has a function that, when the determining unit 304 determines that the first and the second threads operate exclusively, copies copy-source data accessed by the first thread, onto a second storage area different from a first storage area that stores the copy-source data. For example, when the child thread 302 is a blocking thread, the copying unit 305 copies copy-source data in a parent thread context area 311 (first storage area) accessed by the parent thread, onto a parent thread context area 312 (second storage area) for copying. Copy execution information is stored to a storage area of the CPU #0 such as the register, the cache memory, or the RAM 202.

The calculating unit 306 has a function of calculating an offset value for a second address, based on a predetermined value and the second address (destination address of data copied by the copying unit 305). The predetermined value is a mask value indicative of a memory range accessed by the threads. For example, when the memory range to be accessed by the threads is 0x0100 [bytes] such as 0x1000 to 0x10ff or 0x3100 to 0x31ff, the mask value is 0x00ff. The size of the memory area is determined by a memory management function provided by the OS.

The calculating unit 306 may calculate a logical product of the second address that is the destination address of the copied data and an inverted value of the mask value that is a predetermined value, to calculate the offset value of the second address. When the destination address of the copied data is 0x2000 with the mask value of 0x00ff, the calculating unit 306 calculates the offset value of the destination address of the copied data as 0x2000&NOT(0x00ff)=0x2000. NOT( ) is a function that functions to invert bits in the argument.

The calculating unit 306 may calculate an offset value for the address of the copy-source data based on the predetermined value and a first address that is the address of the copy-source data. The calculating unit 306 may calculate a logical product of the address of the copy-source data and the inverted value of the mask value, to calculate an offset value for the address of the copy-source data. For example, when the address of the copy-source data is 0x3000 with the mask value of 0x00ff, the calculating unit 306 calculates the offset value for the address of the copy-source data as 0x3000&NOT(0x00ff)=0x3000. The calculation result is stored to the storage area of the CPU #0 such as the register, the cache memory, or the RAM 202.

The notifying unit has a function that, when the first and the second threads are determined to operate exclusively, gives notification of the offset value for the address of the copy-source data. The notifying unit 307 may further notify the second core of information of the second thread, the predetermined value, and the offset value for the address of the copy-source data. For example, the notifying unit 307 notifies the CPU #1 of information of whether the child thread is a blocking thread or a non-blocking thread, the mask value, the offset value for the destination address of the copied data, and the offset value for the address of the copy-source data. When the first and the second threads are determined not to operate exclusively, the notifying unit 307 may notify the second core of the second thread information.

The setting unit 308 has a function that, when the second thread is executed, sets the address converter 104 and the snoop mechanism 210 corresponding to the core executing the second thread according to the reported information. When the second thread is a blocking thread, the setting unit 308 sets the address converter 104#1 so as to perform address conversion. The setting unit 308 sets, as information for performing the conversion, the predetermined value, the address value to the destination address of the copied data, and the offset value for the address of the copy-source data, into the address converter 104#1. At the same time, the setting unit 308 sets the snoop mechanism 210#1 to a coherency-off setting.

When the second thread is a non-blocking thread, the setting unit 308 sets the address converter 104#1 so as not to perform the address conversion and sets the snoop mechanism 210#1 to a coherency-on setting.

The converting unit 309 has a function that, with respect to access of the copy-source data by the second core after the detection of assignment of the second thread, converts a first address indicating the copy-source data into a third address indicating the copy-destination data, depending on the predetermined value and the offset value for the copy-destination data. For example, the address of a single-core child thread context area 313 is assumed as the copy-source data is 0x3010 and the address of a child thread context area 314 is assumed as the copy-destination data is 0x21010. In this example, in response to access of the single-core child thread context area 313 as the copy-source data, the converting unit 309 converts the accessed address 0x3010 into 0x2010.

The converting unit 309 may convert the third address into a fourth address indicating the copy-source data, based on the predetermined value and the offset value for the copy-source data, with respect to a response to access of the third address. For example, the third address is assumed to be 0x2010 and the address of the single-core child thread context area 313 as the copy-source data is assumed to be 0x3010. In this example, the converting unit 309 converts the response-source address 0x2010 into 0x3010. An example of a conversion method will be described with reference to FIG. 7.

The scheduler 310 has a function of controlling the assignment of threads in the multi-core processor system 100. For example, among threads being executed by the multi-core processor system 100, the scheduler 310 assigns the parent thread 301 and the child thread 302 to the CPU #2 and the CPU #1, respectively.

Figure 4:
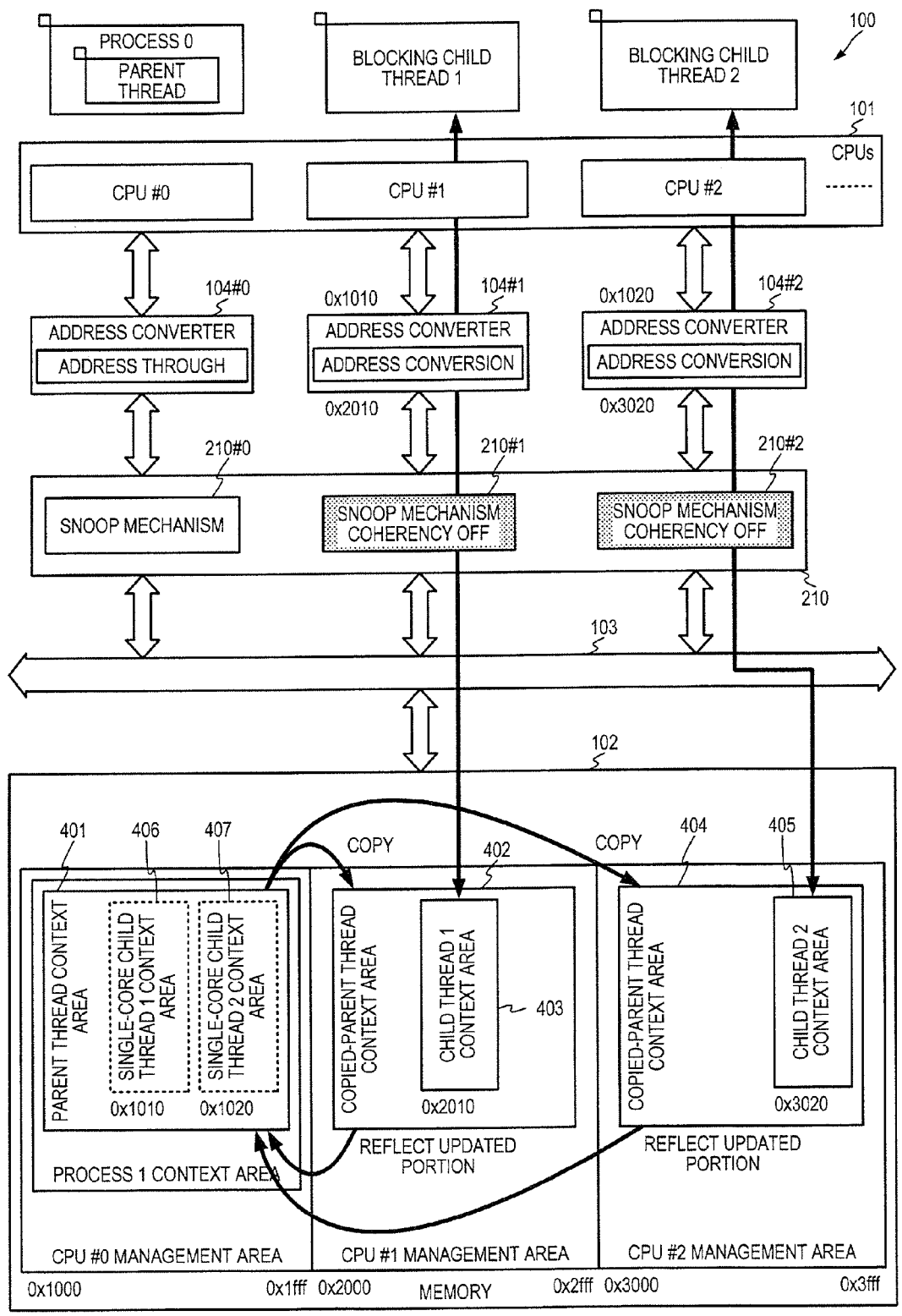
FIG. 4 is an explanatory view of a state of the multi-core processor system 100 in a case where a blocking thread is executed by another CPU.

FIG. 4 is an explanatory view of the state of the multi-core processor system 100 in a case where the blocking thread is executed by another CPU. The multi-core processor system 100 depicted in FIG. 14 includes the CPU #0 to the CPU #2 among the CPUs 101. The CPU #0 executes a parent thread of a process 0, the CPU #1 executes a blocking child thread 1 of the process 0, and the CPU #2 executes a blocking child thread 2 of the process 0.

At the time of start of execution of the blocking child thread 1 and the blocking child thread 2, the CPU #0 copies a parent thread context area 401 located within a CPU #0 management area onto the CPU #1 management area and the CPU #2 management area. After the copying, the CPU #1 generates a child thread 1 context area 403 in a copied-parent thread context area 402. Similarly, the CPU #2 generates a child thread 2 context area 405 in a copied-parent thread context area 404.

At the timing of execution of the blocking child thread 1 and the blocking child thread 2, the multi-core processor system 100 sets the snoop mechanism 210#1 and the snoop mechanism 210#2 to coherency off. At the same time with the setting of the snoop mechanisms 210, the multi-core processor system 100 sets the address converter 104#1 and the address converter 104#2 so as to perform address conversion.

The coherency-off snoop mechanism 210#1 and snoop mechanism 210#2 discontinues establishing the coherency among the cache memories. For example, the snoop mechanism 210#1 and the snoop mechanism 210#2 do not notify other snoop mechanisms 210 of the updated contents.

For example, the address converter 104#1 converts the address accessed in the memory 102 by the CPU #1 from the address of a single-core child thread 1 context area 406 to a child thread 1 context area 403. For example, the address converter 104#1 converts a leading address 0x1010 of the single-core child thread 1 context area 406 into a leading address 0x2010 of the child thread 1 context area 403.

Similarly, the address converter 104#2 converts the address accessed in the memory 102 by the CPU #2 from the address of a single-core child thread 2 context area 407 to a child thread 2 context area 405. For example, the address converter 104#2 converts a leading address 0x1020 of the single-core child thread 2 context area 407 into a leading address 0x3020 of the child thread 2 context area 405.

The blocking child thread 1 may also access the copied-parent thread context area 402 in addition to accessing the child thread 1 context area 403. The parent thread context area stores information of other child threads for example. When the blocking child thread 1 provides a control for stop, restart, etc. of other child threads for example, the CPU #1 alters the state information of other child threads located in the copied-parent thread context area 402.

After the completion of the blocking child thread 1, the CPU #1 reflects an updated portion of the copied-parent thread context area 402 on the parent thread context area 401, which is the copy source. Similarly, after the completion of the blocking child thread 2, the CPU #2 reflects an updated portion of the copied-parent thread context area 404 on the parent thread context area 401, which is the copy source.

In the multi-core processor system 100 depicted in FIG. 4, the CPU #1 and the CPU #2 executing the blocking child threads access separate storage areas to thereby enhance the efficiency of memory access.

Figure 5:
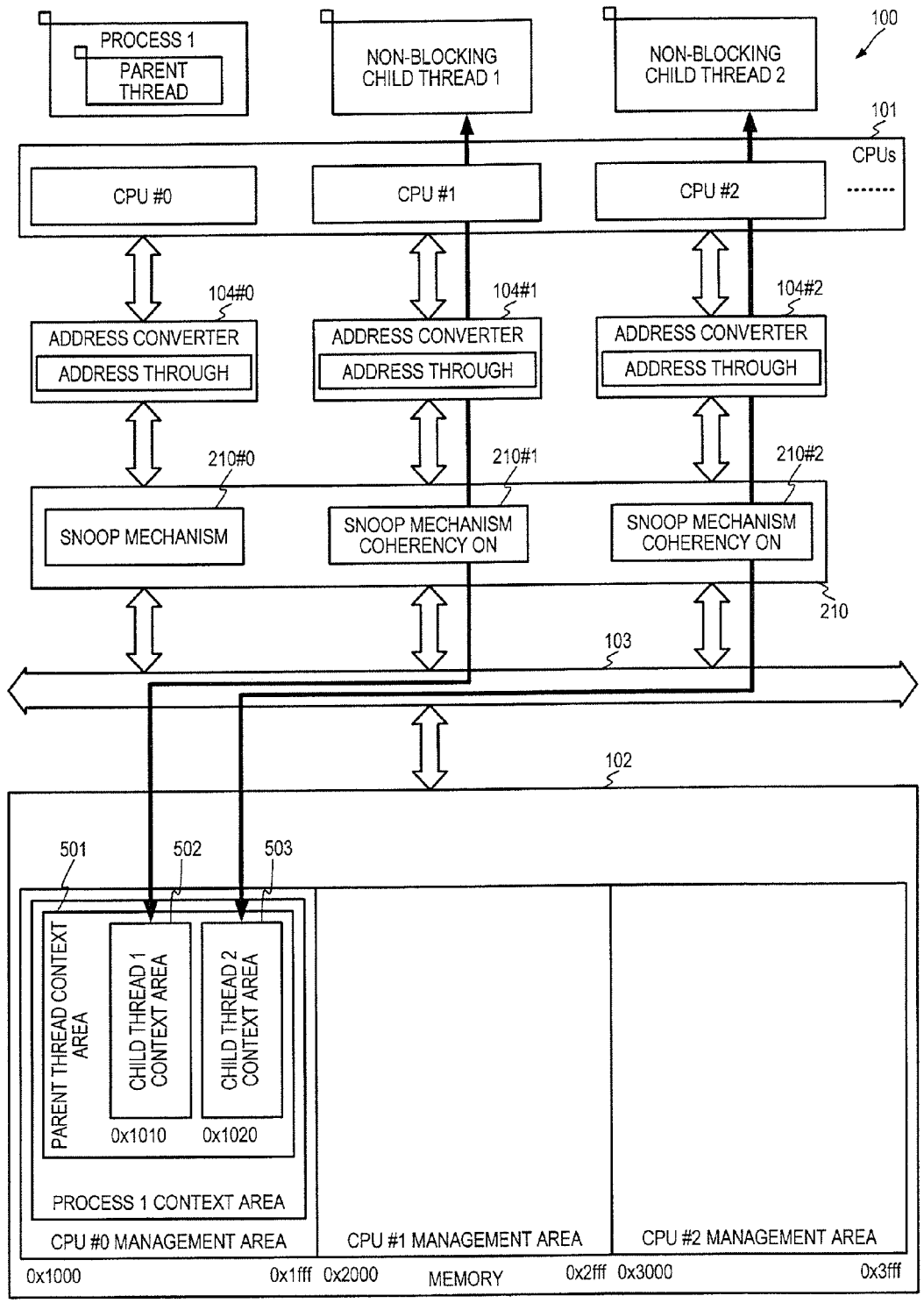
FIG. 5 is an explanatory view of a state of the multi-core processor system 100 in a case where a non-blocking thread is executed by another CPU.

FIG. 5 is an explanatory view of the state of the multi-core processor system 100 in a case where a non-blocking thread is executed by another CPU. The multi-core processor system 100 depicted in FIG. 5 includes the CPU #0 to the CPU #2 in the CPUs 101. The CPU #0 executes a parent thread of the process 1, the CPU #1 executes a non-blocking child thread 1 of the process 1, and the CPU #2 executes a non-blocking child thread 2 of the process 1.

When generating the non-blocking thread, the CPU #1 and the CPU #2 generate a child thread 1 context area 502 and a child thread 2 context area 503 in a parent thread context area 501. At the timing of execution of the non-blocking child thread 1 and the non-blocking child thread 2, the multi-core processor system 100 sets the snoop mechanism 210#1 and the snoop mechanism 210#2 to coherence on.

Figure 6:
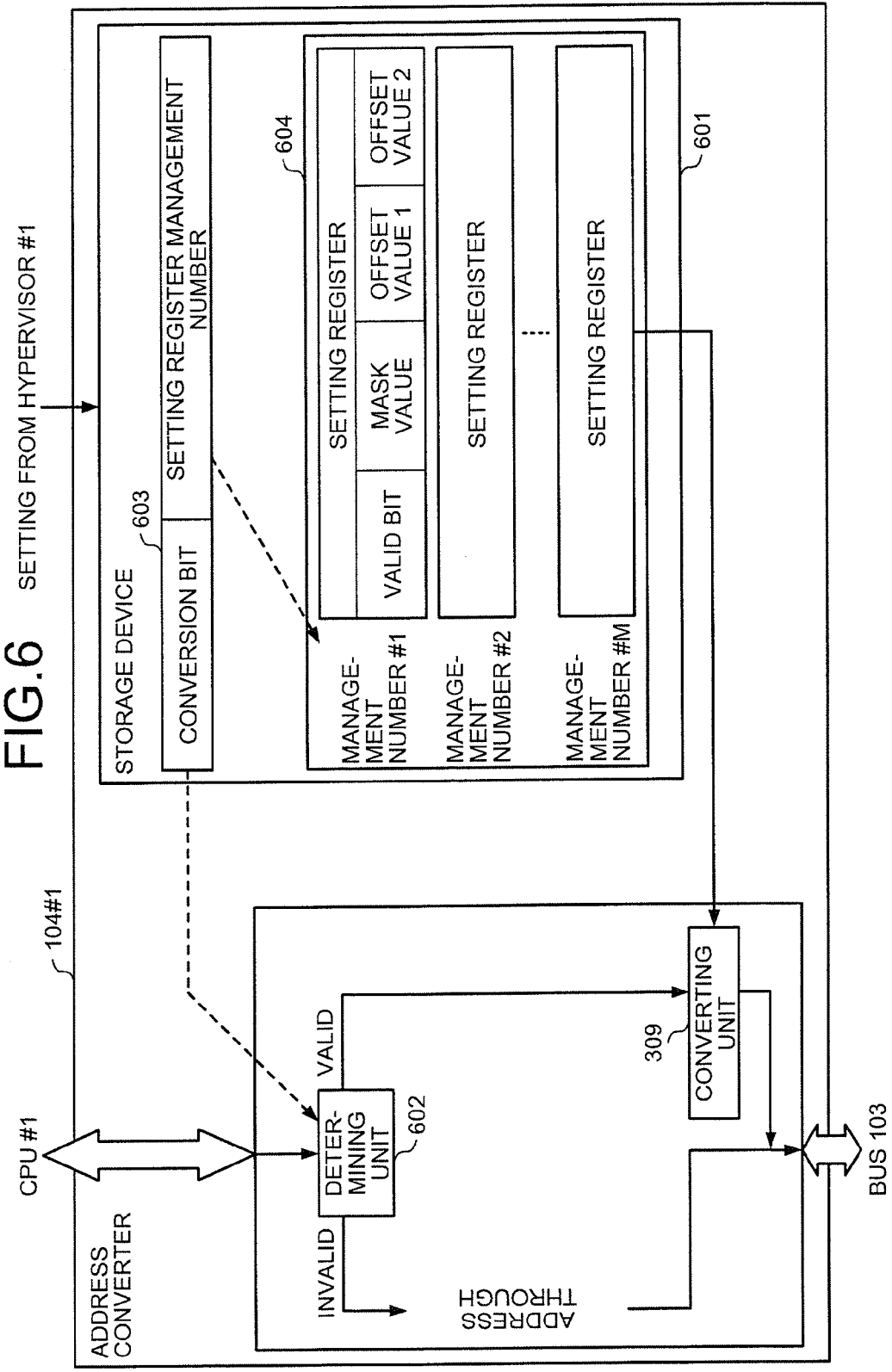
FIG. 6 is an explanatory view of functions of address converters 104.

FIG. 6 is an explanatory view of functions of the address converters 104. Although the address converter 104#1 is described as example with reference to FIG. 6, the address converter 104#0, the address converter 104#2 to the address converter 104#N also have the same functions as those of the address converter 104#1. The address converter 104#1 includes a storage device 601, a determining unit 602, and the converting unit 309.

The storage device 601 has a function of storing a predetermined value, an offset value for the destination address of copied data, and an offset value for the address of copy-source data. The storage device 601 may store multiple combinations of the predetermined value, the offset value for the destination address of the copied data, and the offset value for the address of the copy-source data and may store information of whether to perform address conversion and information identifying an applied combination among the multiple combinations.

For example, the storage device 601 includes a control register 603 and a setting register 604#1 to a setting register 604#M. M is an integer not less than 1. An example of M value may be the maximum number of apps that are concurrently executable by the multi-core processor system 100. The multi-core processor system 100 according to this embodiment assumes a cellular phone, etc., but does not assume the concurrent execution of multiple apps as in a personal computer. For example, M is a value such as 8 or 16.

The control register includes two fields, i.e., a conversion bit field and a setting register management number field. The conversion bit field stores bits indicative of whether to perform the address conversion. The setting register management number field stores which setting register is to be applied among the setting register 604#1 to the setting register 604#M when performing the conversion.

Fields of the setting registers 604 will be described. The setting registers 604 each include four fields, i.e., a valid bit field, a mask value field, an offset value 1 field, and an offset value 2 field.

The valid bit field stores bits indicative of whether the corresponding setting register 604 is valid. The mask value field stores a value of a mask used to extract thread information, among the addresses input to the address converter 104#1. The offset value 1 field stores a value of offset for a child thread context area generated in the copy destination that is an offset value for the address of copy-destination data. The offset value 2 field stores a value of the offset for a child thread context area assumed by the CPU to be an offset value for the address of copy-source data. Setting examples of the control register 603 and the setting registers 604 will be described later with reference to FIG. 7.

The determining unit 602 has a function of determining whether to perform address conversion, based on information stored in the storage device 601. For example, the determining unit 602 performs the address conversion if the conversion bit field is valid and executes the address through without any address conversion if the conversion bit field is invalid. The converting unit 309 has a function of performing address conversion when the determining unit 602 determines that the address conversion is to be performed.

Figure 7:
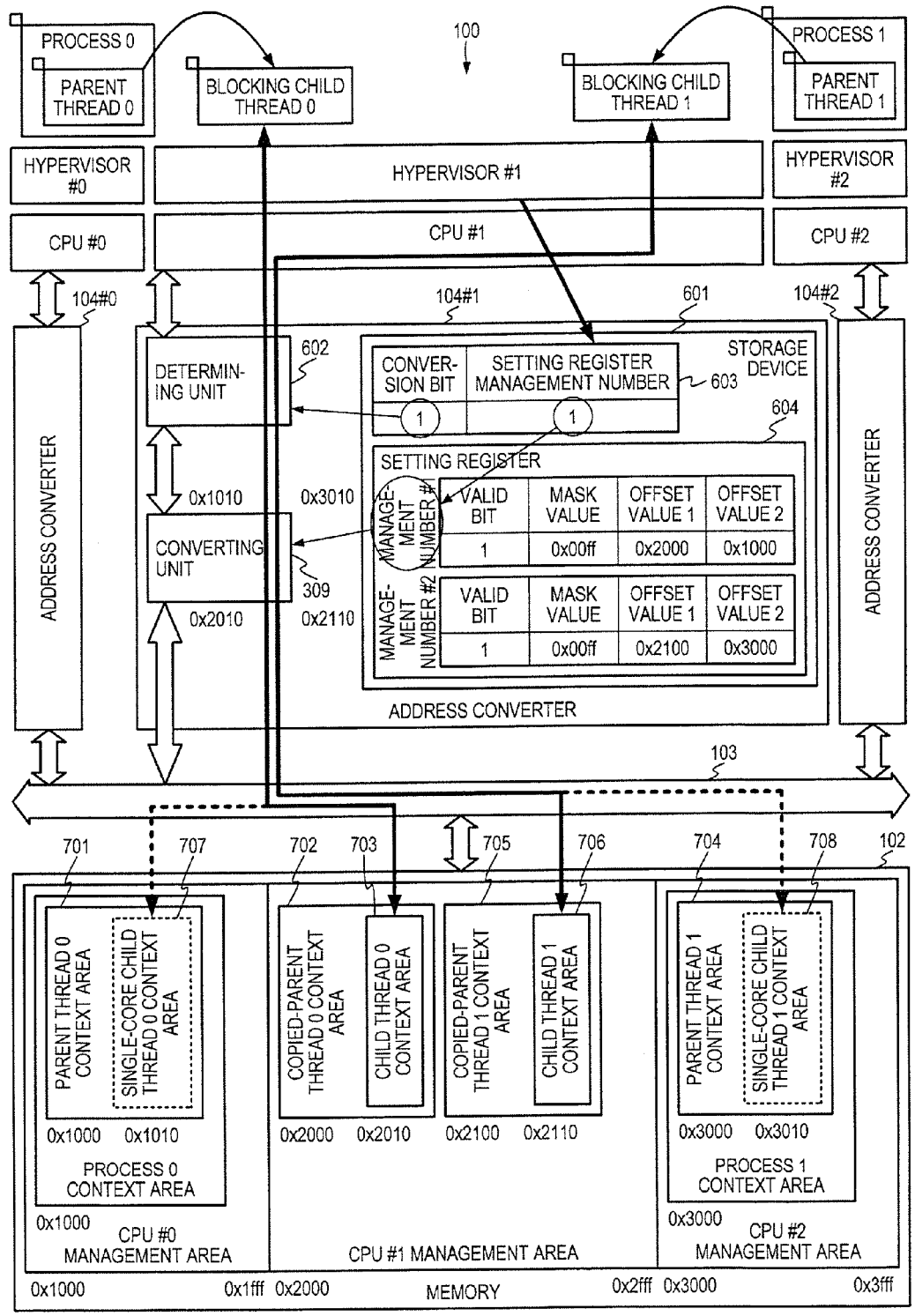
FIG. 7 is an explanatory view of a setting example of the address converter 104 when the blocking thread is executed by other CPUs.

FIG. 7 is an explanatory view of a setting example of the address converter 104 when the blocking thread is executed by other CPUs. The multi-core processor system 100 depicted in FIG. 7 is in a state where the CPU #0 executes the process 0 and the CPU #2 executes the process 1. The multi-core processor system 100 depicted in FIG. 7 omits the denotation of the snoop mechanisms 210. The CPU #0 assigns to the CPU #1, a blocking thread 0 required to be generated by the parent thread 0 of the process 0. Concurrently with the assignment, the CPU #0 copies a parent thread 0 context area 701 onto the CPU #1 management area. The CPU #1 generates a child thread 0 context area 703 in a copy-destination parent thread 0 context area 702.

Similarly, the CPU #2 assigns to the CPU #1, a blocking thread 1 required to be generated by the parent thread 1 of the process 1. Concurrently with the assignment, the CPU #2 copies a parent thread 1 context area 704 onto the CPU #1 management area. The CPU #1 generates a child thread 1 context area 706 in a copy-destination parent thread 1 context area 705.

With this state, the address converter 104#1 converts a single-core child thread 0 context area 707 to be accessed by the blocking child thread 0, into the child thread 0 context area 703 that is a real area. The address converters 104 convert an input pre-conversion address by Equation (1) below into a post-conversion address.

$$\text{Post-conversion address} = \text{pre-conversion address} \& \text{mask value} + \text{offset value 1} \quad (1)$$

For example, a case is assumed where notification of access of the blocking child thread 0 is given as depicted in FIG. 7. The hypervisor #1 detects an execution of the blocking child thread 0 by the CPU #1 to set "1" representative of a "conversion", to a conversion bit of the control register 603 and set "1" as the setting register management number. The setting register 604#1 stores "1" representative of "valid" to the valid bit, "0x00ff" to the mask value, "0x2000" to the offset value 1, and "0x1000" to the offset value 2. Accordingly, the address converter 104#1 converts pre-conversion address="0x1010" as follows from Equation (1).

Post-conversion address=0x1010&0x00ff+0x2000
⇔ post-conversion address=0x0010+0x2000
⇔ post-conversion address=0x2010

In this manner, through the conversion by the address converter 104#1, the destination accessed by the blocking child thread 0 is converted from the single-core child thread 0 context area 707 to the child thread 0 context area 703.

With respect to a response to the access of the child thread 0 context area 703, the address converter 104#1 converts the child thread 0 context area 703 as the actual area into the single-core child thread 0 context area 707. The address converter 104#1 converts an input pre-conversion address by Equation (2) below into a post-conversion address.

$$\text{Post-conversion address} = \text{pre-conversion address} \& \text{mask value} + \text{offset value 2} \quad (2)$$

Accordingly, the address converter 104#1 converts the pre-conversion address="0x2010" as follows from Equation (2).

Post-conversion address=0x2010&0x00ff+0x1000
⇔ post-Conversion address=0x0010+0x1000
⇔ post-conversion address=0x1010

As a result of the conversion by the address converter 104#1 using Equation (2), the address of a response source to the access is converted from the child thread 0 context area 703 into the single-core child thread 0 context area 707. Since the pre-conversion address of Equation (1) coincides with the post-conversion address of Equation (2) as a result of the conversion, the CPU #1 can detect a return of a response to the access by the blocking child thread 0.

Further, a case is assumed where notification of access of the blocking child thread 1 is given. At this time, the address converter 104#1 converts a single-core child thread 1 context area 708 into a child thread 1 context area 706 that is a real area. The hypervisor #1 detects an assignment of the blocking child thread 1 to the CPU #1 to set "1" indicative of "conversion" to the conversion bit of the control register 603 and sets "2" as the setting register management number.

The setting register 604#2 stores "1" indicative of "valid" to the valid bit, "0x00ff" to the mask value, "0x2100" to the offset value 1, and "0x3000" to the offset value 2. Accordingly, the address converter 104#1 converts the pre-conversion address="0x3010" as follows based on Equation (1).

Post-conversion address=0x3010&0x00ff+0x2100
⇔ post-conversion address=0x0010+0x2100
⇔ post-conversion address=0x2110

In this manner, as a result of the conversion of the address converter 104#1, the access destination of the blocking child thread 1 is converted from the single-core child thread 1 context area 708 into the child thread 1 context area 706.

With respect to a response to access of the child thread 1 context area 706, the address converter 104#1 converts the child thread 1 context area 706 that is a real area into the single-core child thread 1 context area 708. Accordingly, the address converter 104#1 converts the pre-conversion address="0x2110" as follows based on Equation (2).

Post-conversion address=0x2110&0x00ff+0x3000
⇔ post-conversion address=0x0010+0x3000
⇔ post-conversion address=0x3010

As a result of the conversion by the address converter 104#1 using Equation (2), the address of a response source to the access is converted from the child thread 1 context area 706 into the single-core child thread 1 context area 708. Since the pre-conversion address of Equation (1) coincides with the post-conversion address of Equation (2) as a result of the conversion, the CPU #1 can detect a return of a response to the access by the blocking child thread 1.

Figure 8:
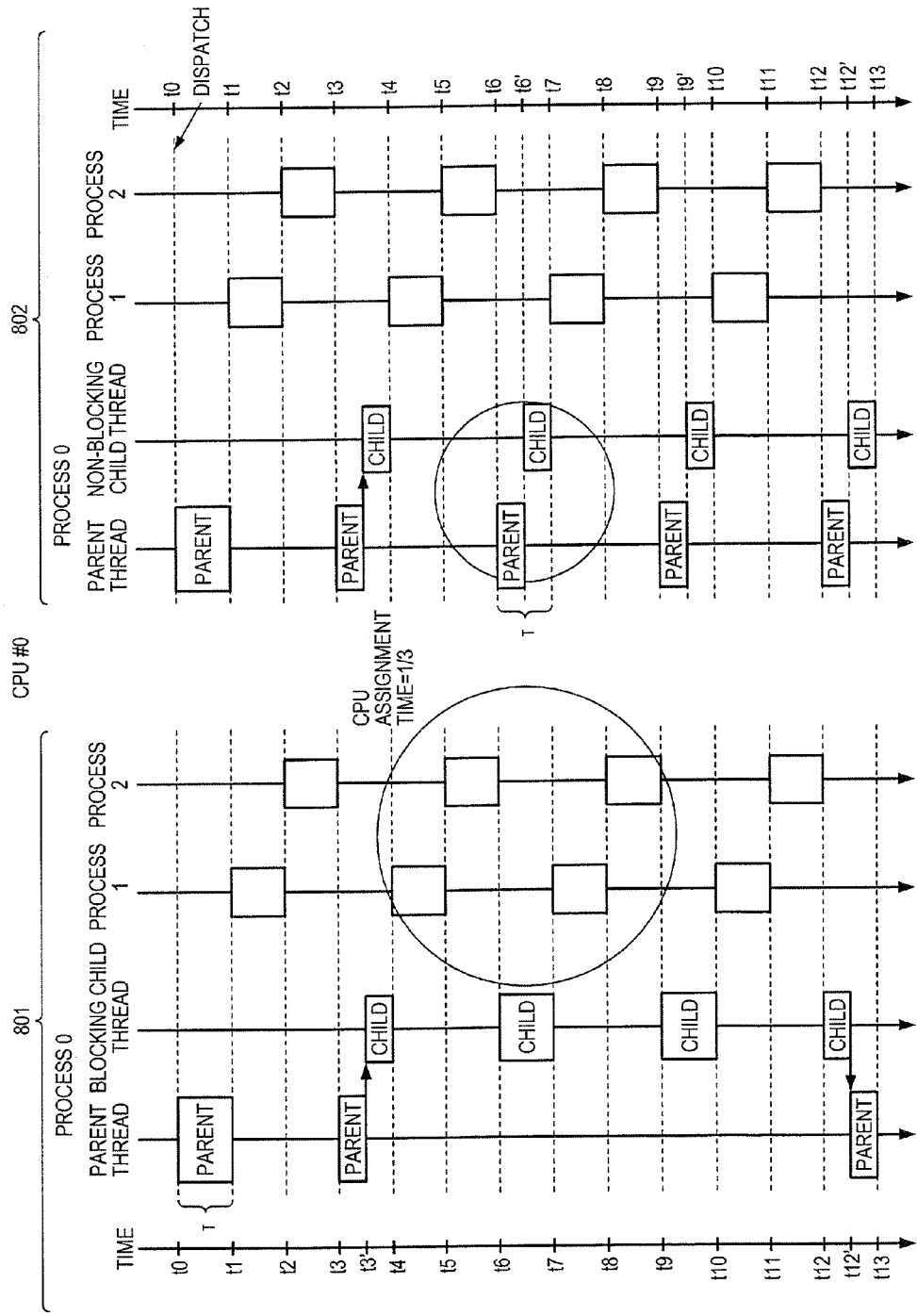
FIG. 8 is an explanatory view of execution timings of a blocking thread and a non-blocking thread when executed by a single core.

FIG. 8 is an explanatory view of execution timings of a blocking thread and a non-blocking thread when executed by a single core. Reference numeral 801 designates the execution timing of the blocking thread and reference numeral 802 designates the execution timing of the non-blocking thread. In FIG. 8, the interval between time tx and time tx+1 as the dispatch interval is set to τ that is the assignment time of one process. The dispatch execution time is a time when communication with the hypervisor #0 is possible. The parent thread, the process 1, and a process 2 are stored in a dispatch table of the CPU #1. The dispatch table is a table that stores identification of executable threads and processes. The OS #0 dispatches to the CPU #0 either a thread or a process indicated in the dispatch table.

In the execution timing designated by reference numeral 801, the CPU #0 executes in addition to the process 1 and the process 2, the process 0 that includes a parent thread that issues a request to generate blocking child threads. At time t0, the CPU #0 dispatches a parent thread in the process 0 by the dispatcher in the OS #0, to execute the parent thread. At time t1 after the elapse of τ, the CPU #0 dispatches the process 1. After the execution of the process 1, at time t2 after a further elapse of τ, the CPU #0 dispatches the process 2. After the execution of the process 2, at time t3 after a further elapse of τ, the CPU #0 dispatches a parent thread of the process 0.

When the parent thread issues a request to generate a blocking child thread at time t3' before the elapse of τ from time t3, the CPU #0 performs dispatch from the parent thread to the blocking child thread. Since the blocking child thread blocks the parent thread, the parent thread is not executed until the completion of the blocking child thread. Further, at time 4 after the elapse of τ from time t3, the CPU #0 dispatches the process 1.

Subsequent to time t4, from time t4 to time t5, from time t7 to time t8, and from time t10 to time t11, the CPU #0 executes the process 1. Similarly, from time t5 to time t6, from time t8 to time t9, and from time t11 to time t12, the CPU #0 executes the process 2. From time t6 to time t7 and from time t9 to time t10, the CPU #0 executes the blocking child thread. When the blocking child thread is completed at time t12' before the elapse of τ from time t12, the CPU #0 dispatches a parent thread for execution until time t13.

In this manner, when the parent thread and the blocking thread are executed by the single core, CPU assignment time of other processes does not change even if the parent thread is under execution or even if the child thread is under execution. In the example designated by reference numeral 801, during the period of time t0 to time t3 during which the parent thread is under execution, the CPU assignment time of the process 1 and the process 2 is one third of the whole. Subsequently, also during the period of time t4 to time t12 during which the blocking child thread is under execution, the CPU assignment time of the process 1 and the process 2 is one third of the whole.

The recovery period of the parent thread suspended by the blocking thread is time t3' to time t12'. If time t3 to time t3' and time t12 to time t12' are assumed to be τ in total, the recovery period of the parent thread is 9τ.

Further, in the example designated by reference numeral 802, the CPU #0 executes in addition to the process 1 and the process 2, the process 0 that includes a parent thread that issues a request to generate a non-blocking child thread. Until time t0 to time t3, the process 0 to the process 2 operate at a timing equal to that in the example designated by reference numeral 801 and therefore, the description thereof will be omitted.

When the parent thread issues a request to generate a non-blocking child thread at time t3' before the elapse of τ from time t3, the CPU #0 performs dispatch from the parent thread to the non-blocking child thread. The non-blocking child thread does not block the parent thread and consequently, the parent thread continues to be executed even during the execution of the non-blocking child thread. Subsequently, at time t4 after the elapse of τ from time t3, the CPU #0 dispatches the process 1.

Subsequent to time t4, from time t4 to time t5, from time t7 to time t8, and from time t10 to time 11, the CPU #0 executes the process 1. Similarly, from time t5 to time t6, from t time t8 to time t9, and from time t11 to time t12, the CPU #0 executes the process 2.

Until time t6' before the elapse of τ from time t6, the CPU #0 executes the parent thread; and until time t6' to time t7, the CPU #0 executes the non-blocking child thread. In the same manner, at time t9' before the elapse of τ from time t9 and at time t12' before the elapse of τ from time t12, the CPU #0 executes the parent thread. Furthermore, from time t9' to time t10 and from time t12' to time t13, the CPU #0 executes the non-blocking child thread.

In this manner, also when the parent thread and the non-blocking thread are executed by the single core, the CPU assignment time of other processes does not change even if the parent thread is under execution or even if the child thread is under execution, similar to the case of the blocking thread. In total, the CPU assignment time of the parent thread and the non-blocking child thread becomes equal to τ, which is equivalent to one process.

Figure 9:
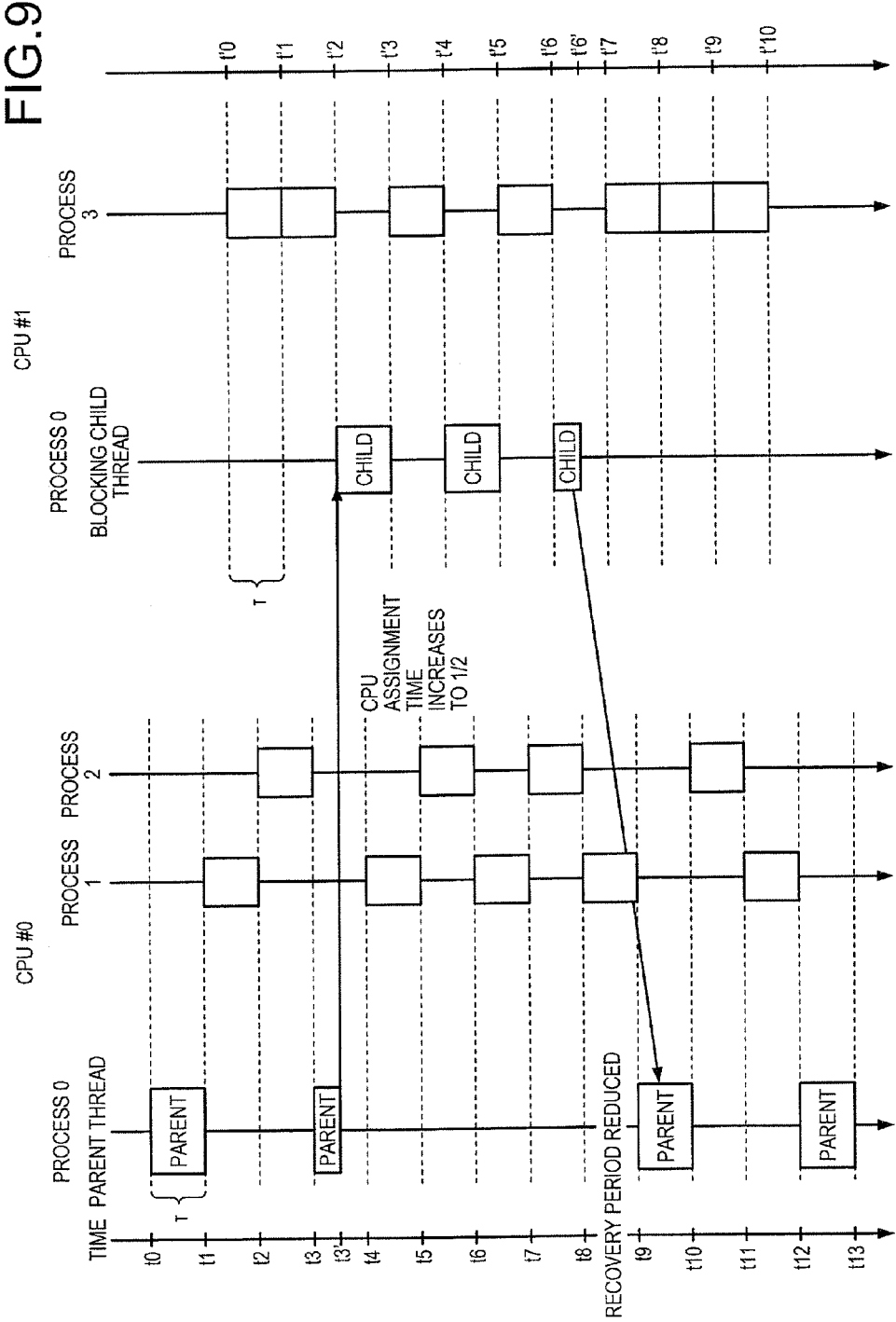
FIG. 9 is an explanatory view of execution timings when a blocking child thread is assigned to a CPU #1.
Figure 10:
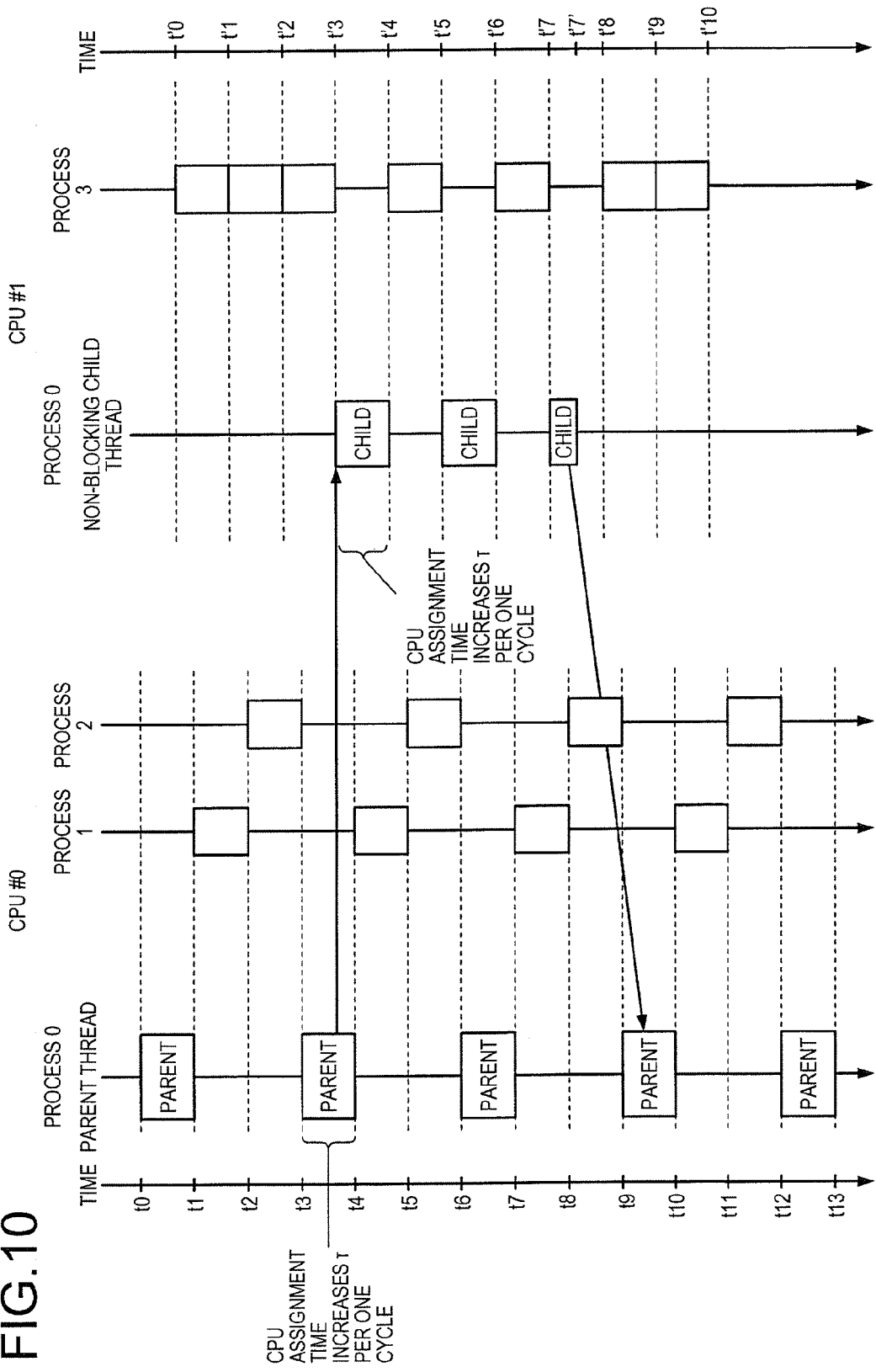
FIG. 10 is an explanatory view of execution timings in a case of assigning the non-blocking child thread to the CPU #1.

FIG. 9 and FIG. 10 depict execution timings when the blocking child thread or the non-blocking child thread is assigned to the CPU #1. In FIG. 9 and FIG. 10, the interval between time tx and time tx+1 as the dispatch interval of the CPU #0 and the interval between time t'x and time t'x+1 as the dispatch interval of the CPU #1 are assumed to be τ that is the assignment time of one process.

FIG. 9 is an explanatory view of execution timings when the blocking child thread is assigned to the CPU #1. In the explanatory view depicted in FIG. 9, the CPU #0 executes the process 0 that includes a parent thread that issues a request to generate a blocking child thread; the process 1; and the process 2; whereas the CPU #1 executes the blocking child thread of the process 0 and a process 3. At time t0, the dispatch table of CPU #0 stores the parent thread of the process 0, the process 1, and the process 2, whereas the dispatch table of the CPU #1 stores the process 3.

The CPU #0 executes the parent thread of the process 0 from time t0 to time t1, executes the process 1 from time t1 to time t2, and executes the process 2 from time t2 to time t3. Further, the CPU #0 dispatches the parent thread at time t3. The CPU #1 executes the process 3 from time t'0 to time t'2.

When the parent thread issues a request to generate a blocking child thread at time t3' before the elapse of τ from time t3, the CPU #0 dispatches the generated blocking child thread to the CPU #1. For example, at time t'2, the blocking child thread is stored to the dispatch table of the CPU #1. Subsequently, the CPU #1 acquires a blocking child thread from the dispatch table, for dispatch to the CPU #1. Since the blocking child thread blocks the parent thread, the parent thread is not executed until the completion of the blocking child thread. Accordingly, the CPU #0 stores the parent thread from the dispatch table of the CPU #0. As a result, the parent thread is not dispatched and thus, is not executed. Subsequently, the CPU #0 dispatches the process 1 at time t4 after the elapse of τ from time t3.

After time t4, from time t4 to time t5, from time t6 to time t7, and from time t8 to time t9, the CPU #0 executes the process 1. Similarly, from time t5 to time t6 and from time t7 to time t8, the CPU #0 executes the process 2. From time t'2 to time t''3 and from time t'4 to time t'5, the CPU #1 executes the blocking child thread, while from time t'3 to time t'4 and from time t'5 to time t'6, the CPU #1 executes the process 3.

When the blocking child thread is completed at time t6' before the elapse of τ from time t6', the CPU #1 notifies the CPU #0 of the recovery of the parent thread to the dispatch table of the CPU #0. Upon receiving the notification, the CPU #0 dispatches the parent thread at time t9. Subsequent to time t9, from time t9 to time t10 and from time t12 to time t13, the CPU #0 executes the process 2. The CPU #0 executes the process 1 from time t11 to time t12. The CPU #1 executes the process 3 from time t'7 to time t'10.

In this manner, when the parent thread and the blocking thread are executed by the multi-cores, assignment time of other CPUs increases compared to that of the single core. In the example of FIG. 9, during the period from time t0 to time t3 during which the parent thread is under execution, the CPU assignment time of the process 1 and the process 2 are one third of the whole. Further, during the period of time t4 to time t9 during which the blocking thread is executed by the CPU #1, the CPU assignment time of the process 1 and the process 2 is one half, resulting in an increase of the CPU assignment time.

The recovery period of the parent thread suspended by the blocking thread is time t3' to time t9. Assuming that the time t3 to time t3' is 0.5τ, the recovery period of the parent thread is 5.5τ, and the multi-core execution of the parent thread and the blocking thread can reduce the recovery period to a further extent as compared to the single-core execution.

FIG. 10 is an explanatory view of execution timings in the case of assigning the non-blocking child thread to the CPU #1. In the explanatory view depicted in FIG. 10, the CPU #0 executes in addition to the process 1 and the process 2, the process 0 that includes a parent thread that issues a request to generate blocking child threads, whereas the CPU #1 executes the process 3 and the non-blocking child thread in the process 0. At time t0, the dispatch table of the CPU #0 stores the parent thread of the process 0, the process 1, and the process 2, whereas the dispatch table of the CPU #1 stores the process 3.

The CPU #0 executes the parent thread of the process 0 from time t0 to time t1, the process 2 from time t1 to t2, and the process 1 from time t2 to t3. Subsequently, the CPU #0 dispatches the parent thread at time t3. The CPU #1 executes the process 3 from time t'0 to time t'2. The CPU #1 executes the process 3 from time t'2 to time t'3.

When the parent thread issues a request to generate a blocking child thread before the elapse of τ from time t3, the CPU #0 dispatches the non-blocking child thread to the CPU #1. For example, at time t'3, the non-blocking child thread is stored in the dispatch table of the CPU #1. Subsequently, the CPU #1 acquires the non-blocking child thread from the dispatch table to be dispatch to the CPU #1. Since the non-blocking child thread does not block the parent thread, the parent thread continues to be executed even during the execution of the non-blocking child thread. Accordingly, the CPU #0 executes the parent thread till time t4.

Subsequent to time t4, from time t4 to time t5, from time t7 to time t8, and from time t10 to time t11, the CPU #0 executes the process 1. Similarly, from time t5 to time t6, from time t8 to time t9, and from time t11 to time t12, the CPU #0 executes the process 2. The CPU #1 executes the non-blocking child thread from time t'3 to time t'4 and from time t'5 to time t'6 and executes the process 3 from time t'4 to time t'5 and from time t'6 to time t'7.

When the non-blocking child thread is completed at time t'7 before the elapse of τ from the time t'7, the CPU #0 dispatches the process 3 at time t'8. Then, at time t'8 to time t'10, the CPU #1 executes the process 3.

In this manner, in the case of the multi-core execution of the parent thread and the non-blocking thread, the CPU assignment time of the parent thread and the non-blocking child thread is respectively τ, which corresponds to one process and is greater than the assignment time for the single core. As a result, the non-blocking thread is completed earlier as compared to a case of single-core execution.

Using the functions depicted in FIG. 3 and FIG. 6, the multi-core processor system 100 executes the single-core-use execution object by the multiple cores. With reference to FIG. 11 to FIG. 14, the setting processing at the time of the start of execution of the thread assigned to another CPU, the processing during the execution and the processing at the time of completion will be described. Although in FIG. 11 to FIG. 14 the OS #0 executed by the CPU #0 detects a generation of the assigned thread, an OS executed by another CPU among the CPU #1 to the CPU #N may detect the generation.

Figure 11:
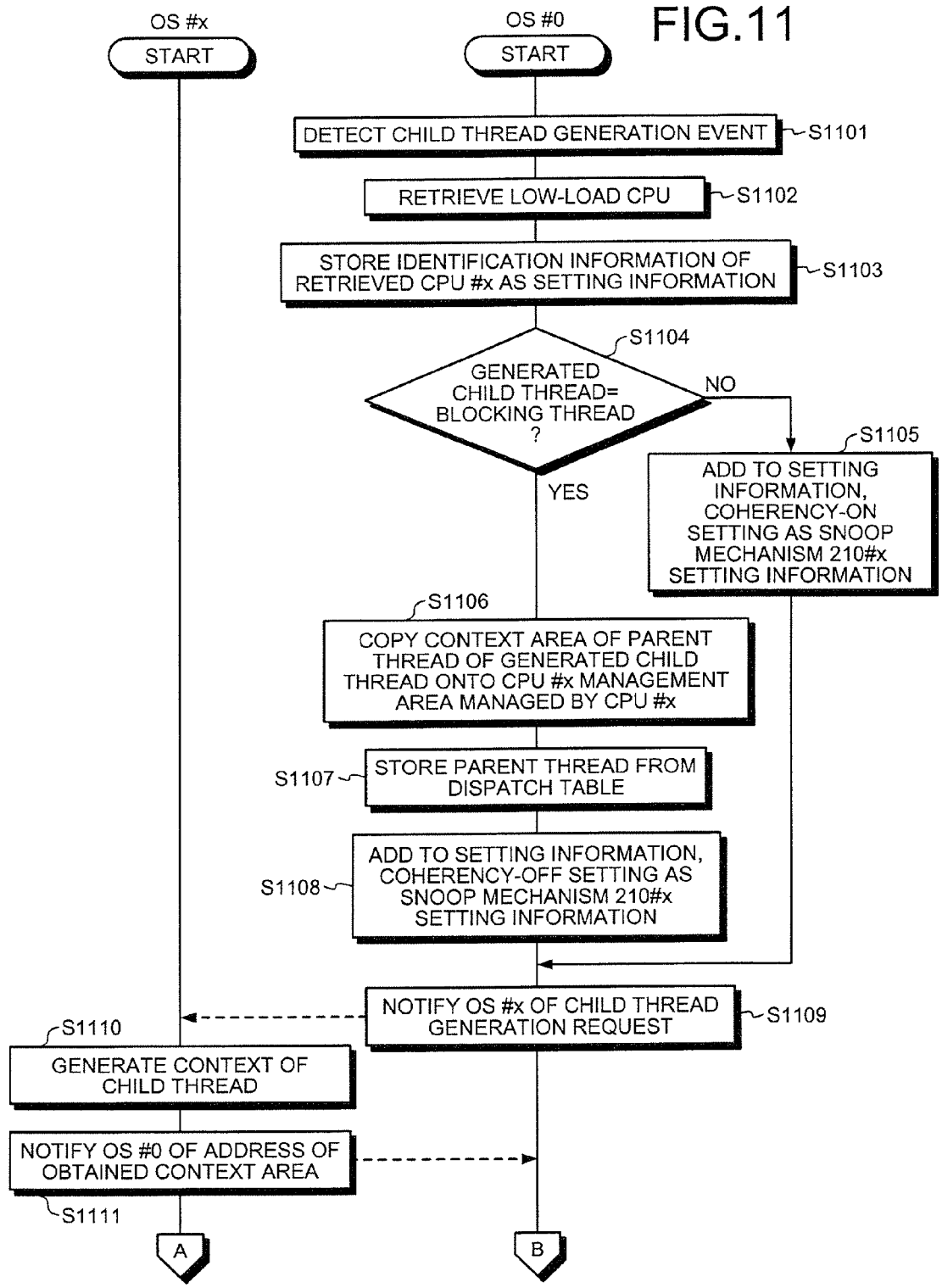
FIG. 11 is a flowchart (1) of setting processing at the time of execution start of a child thread assigned to another CPU.

FIG. 11 is a flowchart (1) of the setting processing at the time of execution start of a child thread assigned to another CPU. The OS #0 detects a child thread generation event (step S1101). After the detection, the OS#0 retrieves a low-load CPU among the CPUs 101 (step S1102). When a CPU #x is retrieved as the low-load CPU, the OS #0 stores identification information of the retrieved CPU #x as the setting information (step S1103). The storage destination of the setting information is in the memory 102. After the storage, the OS#0 determines whether the generated child thread is a blocking thread (step S1104).

If the generated child thread is a non-blocking thread (step S1104: NO), the OS #0 adds to the setting information, the coherency-on setting as the snoop mechanism 210#x setting information (step S1105). If the generated child thread is a blocking thread (step S1104:YES), the OS#0 copies a context area of a parent thread of the generated child thread onto a CPU #x management area managed by the CPU #x (step S1106). After the copying, the OS #0 stores the parent thread from the dispatch table (step S1107). After storing the parent thread, the OS #0 adds to the setting information, the coherency-off setting as the snoop mechanism 210#x setting information (step S1108).

After the addition of the snoop mechanism 210 setting information at step S1105 or step S1108, the OS #0 notifies the OS #x of a child thread generation request (step S1109). After the notification, the OS #0 shifts to the operation at step S1201 depicted in FIG. 12. Upon receiving the notification, the OS #x generates a context of the child thread (step S1110). Generating the context of the child thread means generating the child thread.

If the generated child thread is a blocking thread, the generation destination of the child thread context is in the context area of the parent thread copied onto the CPU #x management area. If the generated child thread is a non-blocking thread, the generation destination is in the context area of the parent thread located within the CPU #0 management area. After the generation, the CPU #x notifies the OS #0 of the address of the obtained context area (step S1111). After the notification, the OS #x stands by until the reception of a notice from the OS #0 at step S1211 depicted in FIG. 12.

Figure 12:
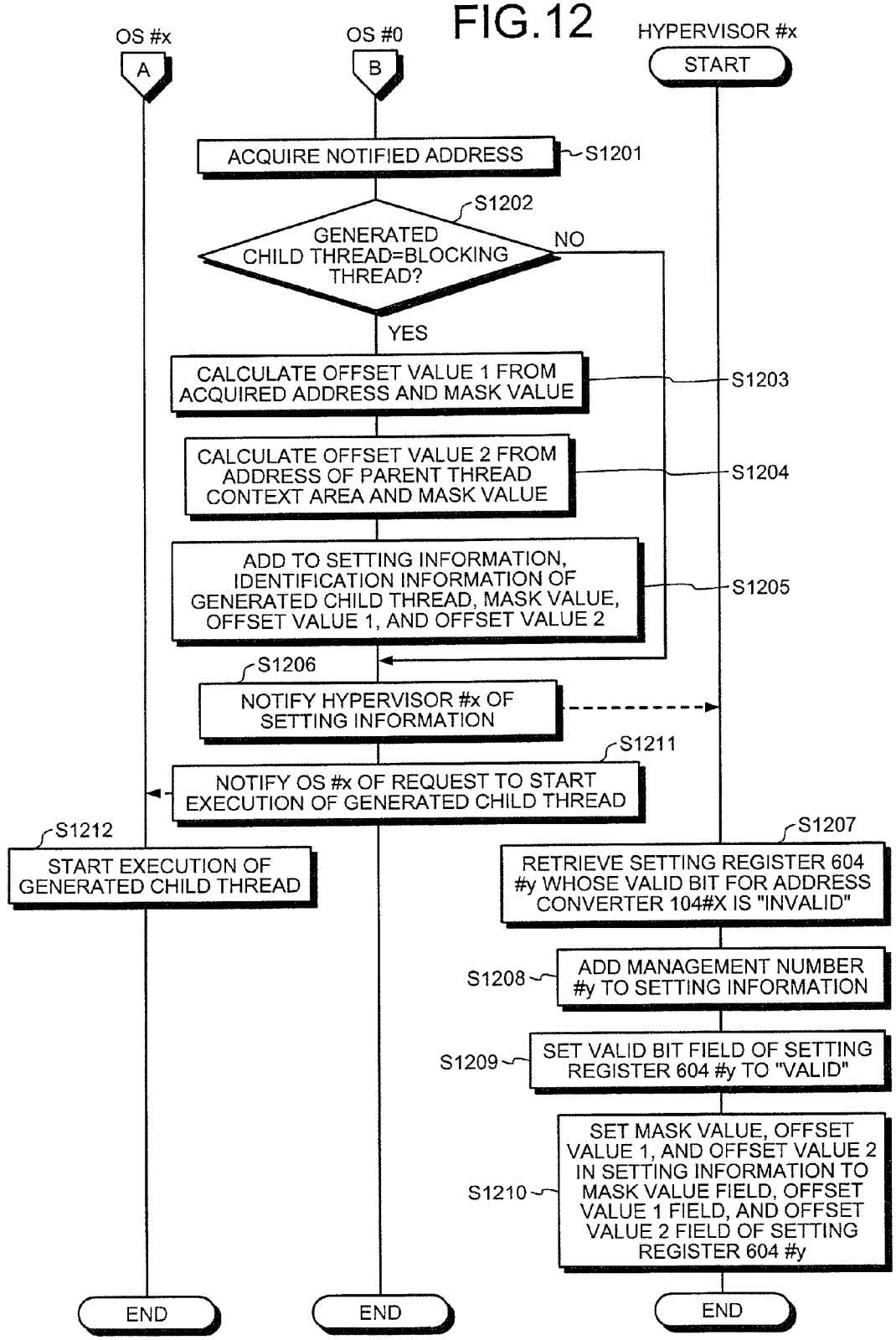
FIG. 12 is a flowchart (2) of the setting processing at the time of the start of execution of a child thread assigned to another CPU.

FIG. 12 is a flowchart (2) of the setting processing at the time of the start of execution of a child thread assigned to another CPU. After the reception of the notification from the OS #x at the operation at step S1111, the OS #0 acquires the notified address (step S1201). After the acquisition, the OS #0 determines whether the generated child thread is a blocking thread (step S1202). If the generated child thread is a blocking thread (step S1202:YES), the OS #0 calculates an offset value 1 from the acquired address and mask value (step S1203).

As an example of offset value 1 calculation method, for example, the OS #0 calculates a logical product of the acquired address and an inverted value to the mask value as the predetermined value of the memory area accessed by the thread and sets the calculation result as the offset value 1. For example, when the acquired address is 0x2010 and the mask value is 0x00ff, the OS #0 obtains 0x2010&NOT(0x00ff) =0x2000 as the offset value 1.

Further, the OS #0 calculates the offset value 2 from the address of the parent thread context area and the mask value (step S1204). As an example of offset value 2 calculation method, for example, similar to the offset value 1 calculation method, the OS #0 calculates a logical product of the address of the parent thread context area and an inverted value to the mask value as the predetermined value and uses the calculation result as the offset value 2. For example, when the address of the parent thread context area is 0x1000 and the mask value is 0x00ff, the OS #0 obtains 0x1000&NOT (0x00ff)=0x1000 as the offset value 2.

After the calculation, the OS #0 adds to the setting information, the identification information of the generated child thread, the mask value, the offset value 1, and the offset value 2 (step S1205). After the addition or if the child thread is a non-blocking thread (step S1202: NO), the OS #0 notifies the hypervisor #x of the setting information (step s1206).

If direct notification from the OS #0 to the hypervisor #x is not feasible, the OS #0 may temporarily notify the hypervisor #0 of the setting information, after which the hypervisor #0 may notify the hypervisor #x of the setting information through inter-hypervisor communication. Alternatively, the OS#0 may notify the OS #x of the setting information and then the OS #x may notify the hypervisor #x of the setting information. Further, since the setting information is stored in the memory 102, the OS #0 may notify the hypervisor #x of a pointer to the setting information.

Upon receiving the notification, the hypervisor #x retrieves a setting register 604 #y whose valid bit for the address converter 104#x is "invalid" (step S1207). As the retrieval method, the hypervisor #x may retrieve the setting register 604#1 to setting register 604#M in ascending order of number, from the setting register 604 having the lowest number.

After the retrieval, the hypervisor #x adds the management number #y to the setting information (step S1208). After the addition, the hypervisor #x sets the valid bit field of the setting register 604 #y to "valid" (step S1209). After the setting, the hypervisor #x sets the mask value, the offset value 1, and the offset value 2 in the setting information to the mask value field, the offset value 1 field, and the offset value 2 field of the setting register 604 #y (step S1210). After the completion of the setting, the hypervisor #x terminates the setting processing at the start of execution of the child thread.

After the notification to the hypervisor #x, the OS #0 notifies the OS #x of a request to start the execution of the generated child thread (step S1211) and the OS #0 terminates the setting processing at the start of execution of the child thread. Upon receiving the notification, the OS #x starts the execution of the generated child thread (step S1212) and terminates the setting processing at the start of execution of the child thread.

If the setting register 604 whose valid bit is invalid is not present at the operation at step S1207, the hypervisor #x may notify the OS #0 of a failure. Upon receiving the notification of the failure, the OS #0 may for example discard the child thread context generated by the OS #x and thereafter may again retrieve a low-load CPU different from the CPU #x.

Figure 13:
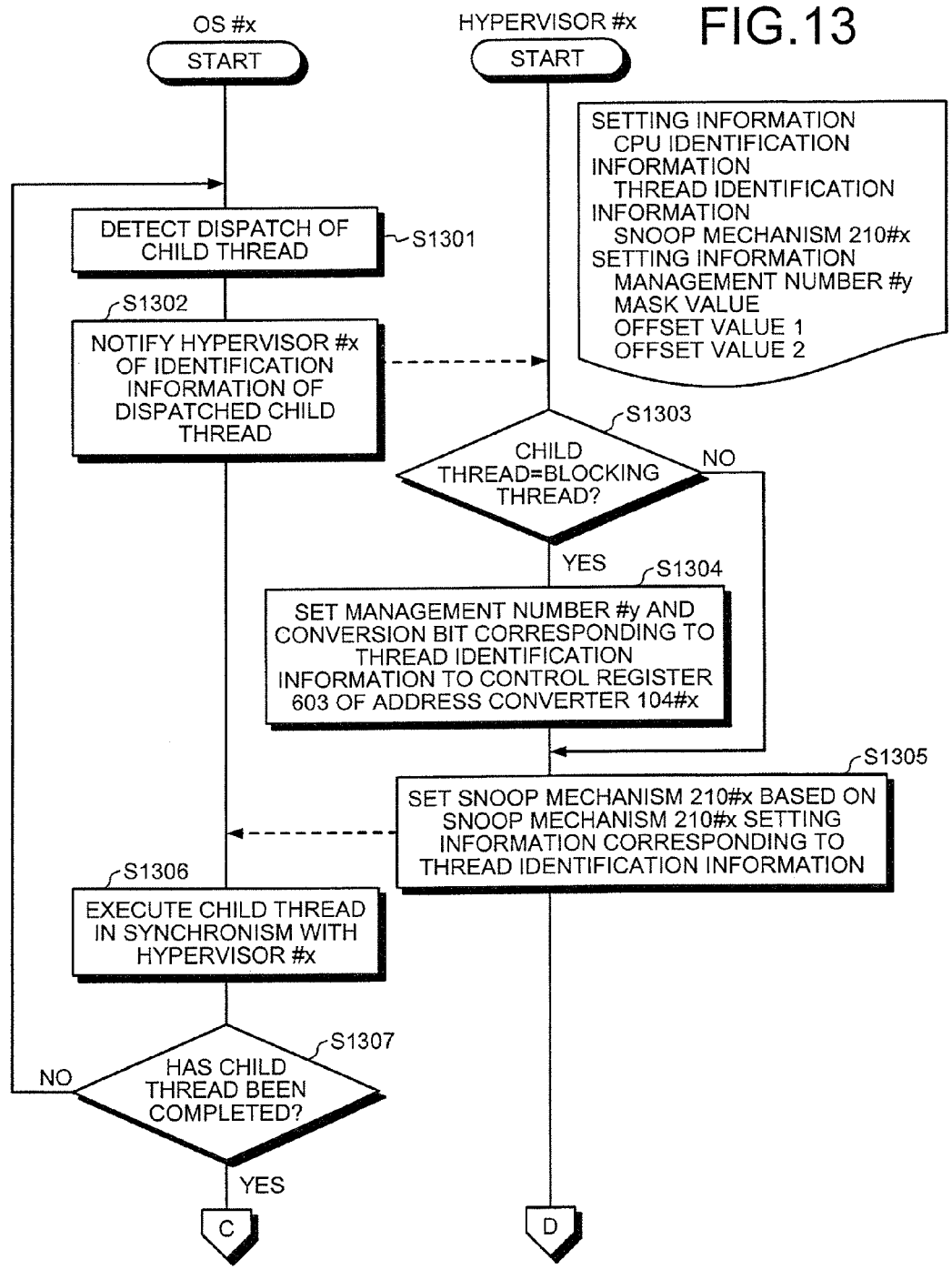
FIG. 13 is a flowchart (1) of processing at the time of the execution of the child thread and processing at the time of the completion thereof.

FIG. 13 is a flowchart (1) of the processing at the time of the execution of the child thread and the processing at the time of the completion thereof. From the flowcharts depicted in FIG. 11 and FIG. 12, the setting information includes CPU identification information, thread identification information, and snoop mechanism 210#x setting information. When the child thread set as the thread identification information is a blocking thread, the setting information further includes the management number #y, the mask value, the offset value 1, and the offset value 2.

FIG. 13 depicts the processing at the time of the execution of the child thread. The OS #x detects a dispatch of a child thread (step S1301). After the detection, the OS #x notifies the hypervisor #x of identification information of the dispatched child thread (step S1302). Upon receiving the notification, the hypervisor #x determines whether the child thread is a blocking thread (step S1303). If the child thread is a blocking thread (step S1303: YES), the hypervisor #x sets the management number #y and the conversion bit corresponding to the thread identification information to the control register 603 of the address converter 104#x (step S1304).

After the setting or if the child thread is not a blocking thread (step S1303: NO), the hypervisor #x sets the snoop mechanism 210#x based on the snoop mechanism 210#x setting information corresponding to the thread identification information (step S1305). After the completion of the setting by the hypervisor #x, the OS #x executes the child thread in synchronism with hypervisor #x (step S1306). For example, the OS #x stands by until the completion of the setting by the hypervisor #x and after the completion of the setting, executes the child thread.

After the execution of the child thread, the OS #x determines whether the child thread has been completed (step S1307). If the child thread has not been completed (step S1307: NO), the OS #x shifts to the processing at step S1301. If the child thread has been completed (step S1307: YES), the OS #x shifts to the operation at step S1401 depicted in FIG. 14. Each time a notice of thread identification information is received from the OS #x at step S1302, the hypervisor #x performs the operations at step S1303 to step S1305.

FIG. 14 is a flowchart (2) of the processing at the time of the execution of the child thread and the processing at the time of the completion thereof. FIG. 14 depicts the processing at the completion of the child thread. When the child thread has been completed, the OS #x determines whether the child thread is a blocking thread (step S1401). If the child thread is a blocking thread (step S1401: YES), the OS #x reflects an updated portion of the copied-parent thread context area on the copy-source parent thread context area (step S1402). After the reflection, the OS #x notifies the OS #0 of a dispatch table return request of the parent thread (step S1403). Upon receiving the notification, the OS #0 returns the parent thread to the dispatch table (step S1404), ending the processing at the time of the completion of the child thread.

After the notification to the OS #0 or if the child thread is a non-blocking thread (step S1401: NO), the OS #x notifies the hypervisor #x of a management number delete request (step S1405). Upon receiving the notification, the hypervisor #x sets the valid bit of the setting register 604#y of the address converter 104#x to "invalid" (step S1406), ending the processing at the time of completion of the child thread. After the notification to the hypervisor #x, the OS #x deletes the setting information (step S1407), ending the processing at the time of the completion of the child thread.

As described, according to the scheduling method and the multi-core processor system, the parent thread context area is copied and the offset value is converted so that a CPU executing the blocking child thread accesses the copied context area. Thus, in the multi-core processor system, the CPUs respectively access different addresses so that the blocking child thread can be executed by another CPU other than the CPU for the parent thread, to achieve the distribution of load of single-core-use processes. It is also possible for the multi-core processor system to perform the parallel processing by the multiple cores without altering the execution object for the single core, to thereby achieve a reduction in the number of verification steps of software.

In the multi-core processor system according to this embodiment, the blocking thread is transferable to other CPUs so that the load quantities of the CPUs can come closer to the balanced state than the multi-core processor system according to the prior art example.

For example, a case is assumed where, when the parent thread is under execution and a blocking child thread with large load quantity is not under execution, the load distribution according to the technique of Prior Art 3 is performed, after which the blocking child thread with large load quantity is executed. At this time, the multi-core processor system according to the prior art example cannot transfer the blocking child thread and as a result, load concentrates at a CPU executing the parent thread. In the multi-core processor system according to this embodiment, the blocking child thread can be migrated to a CPU with less load so that the load can come into a better balanced state.

The multi-core processor system may allow a CPU with less load among multiple CPUs to execute the blocking child thread, enabling the multi-core processor system to balance the load. Furthermore, the multi-core processor system causes a CPU with less load to execute the blocking child thread so that the assignment time of the blocking child thread is increased, thus achieving a reduction in the completion time of the child thread as well as a reduction in the recovery period of the parent thread.

When assigning a blocking child thread to another CPU, the multi-core processor system may store a parent thread from the dispatch table of a CPU executing the parent thread. As a result, the multi-core processor system prevents the parent thread from being assigned to the CPUs so that the CPU assignment time of other processes or other threads can be increased.

When executing a non-blocking thread by another CPU, the multi-core processor system may turn on the coherency setting of the cache memory, enabling the multi-core processor system to maintain the coherency of data when multiple CPUs access the same area.

When executing a blocking thread by another CPU, the multi-core processor system may turn off the coherency setting of the cache memory. When the child thread is a blocking thread, another CPU accesses a copied-parent thread context area. Accordingly, multiple CPUs do not access the same address, so that cache memory coherency does not need to be performed, enabling the multi-core processor system to prevent the functions of the snoop mechanisms from being invoked each time memory is accessed and thus, increasing memory access processing speed. Due to the suspension of the snoop mechanisms, the multi-core processor system can reduce power consumption.

Upon the completion of the blocking thread, the multi-core processor system may reflect an updated portion of a copied-parent thread context area on a copy-source parent thread context area so that the parent thread returns to the dispatch cycle, enabling the multi-core processor system to establish a state equivalent to that established by single-core execution.

The scheduling method described in this embodiment can be implemented by a computer such as a personal computer or a workstation running a previously provided program. A program executing this scheduling method is recorded on a computer-readable record medium such as a hard disk, a flexible disk, CD-ROM, MO, and DVD and is run by a computer that reads out the program from the record medium. The program executing this scheduling method may be distributed via a network such as Internet.

The address converter 104 described in this embodiment can be implemented by an application specific integrated circuit (hereinafter, "ASIC") such as a standard cell and a structured ASIC or a programmable logic device (PLD) such as FPGA. For example, the above-described functions (the storage device 601, the determining unit 602, and the converting unit 309) of the address converter 104 may be function-defined by HDL description and the logical combination of the HDL description may be imparted to the ASIC or the PLD, to fabricate the address converter 104.

The scheduling method and multi-core processor system enable load to be distributed among multiple cores without changing execution objects for single cores.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method of a scheduler configured to manage threads executed by a processor of a computer, the scheduling method comprising:
selecting a central processing unit (CPU) of relatively less load, when a second thread is generated from a first thread to be processed;
determining whether the second thread operates exclusively from the first thread;
copying a first storage area accessed by the first thread onto a second storage area managed by the CPU, when it is determined that the second thread operates exclusively;
generating a second thread context area in the first storage area, when it is determined that the second thread does not operate exclusively from the first thread;
calculating, based on an address of the second storage area and a predetermined value, an offset for a second address for the second thread to access the first storage area; and
notifying the offset for the second address to the CPU for converting a first address to a third address for accessing the second storage area.

2. The scheduling method according to claim 1, further comprising accessing the second storage area, based on the third address, by the second thread.

3. The scheduling method according to claim 1, wherein:
the calculating includes calculating an offset for the first address, based on an address of the first storage area and the predetermined value, and
the notifying includes notifying the CPU of the offset for the first address to convert, responsive to access of the second storage area and based on an offset to the first address and the predetermined value, the third address to a fourth address indicating the first storage area.

4. The scheduling method according to claim 1, further comprising storing the first thread after the copying of the first storage area to the second storage area.

5. The scheduling method according to claim 1, further comprising turning on a flag for synchronizing a cache memory, when the first thread does not operate exclusively.

6. The scheduling method according to claim 1, further comprising turning off a flag for synchronizing a cache memory after the copying of the first storage area to the second storage area.

7. The scheduling method of according to claim 1, further comprising reflecting, when the second thread is completed, an updated portion of the second storage area on the first storage area to recover the first thread.

8. A multi-core processor system comprising:
a plurality of central processing units (CPUs) including a first central processing unit (CPU) and a second CPU;
a scheduler corresponding to the first CPU;
a memory including a first storage area and a second storage area, the memory being connected via a bus to the CPUs; and
an address converter disposed between at least one CPU among the CPUs and the memory, wherein:

the address converter is configured to convert an address for accessing the first storage area managed by the first CPU, into an address for accessing the second storage area managed by the second CPU;

the address converter is further configured to convert the address for accessing the first storage area when a flag is on, the flag being configured to be set based on a type of a second thread that is generated based on a first thread executed by the first CPU and being configured to be set to on when the second thread is a blocking thread; and a second thread context area is generated in the first storage area when it is determined that the second thread does not operate exclusively from the first thread.

9. The multi-core processor system according to claim 8, wherein the address converter is further configured to convert the address for accessing the first storage area, based on an offset between an address of the first storage area and an address for accessing the first storage area by a second thread that is generated based on a first thread executed by the first CPU.

10. The multi-core processor system according to claim 8, wherein the address converter is further configured to convert, responsive to access of the second storage area, an address of the second storage area into an address of the first storage area, based on an offset for the first storage area and a predetermined value.

11. The scheduling method according to claim 1, wherein copying a first storage area accessed by the first thread onto a second storage area comprises copying data stored in the first storage area accessed by the first thread into the second storage area.

12. The scheduling method according to claim 1, wherein the second thread comprises a blocking child thread of the first thread.

13. The scheduling method according to claim 12, wherein execution of the first thread is suspended while the blocking child thread is being executed.

* * * * *